United States Patent
Frenne et al.

(10) Patent No.: US 12,426,043 B2
(45) Date of Patent: Sep. 23, 2025

(54) RATE MATCHING FOR NON-COHERENT JOINT-TRANSMISSION WITH DYNAMIC SPECTRUM SHARING

(71) Applicant: Telefonaktiebolaget LM Ericsson (publ), Stockholm (SE)

(72) Inventors: Mattias Frenne, Uppsala (SE); Sebastian Faxér, Stockholm (SE); Siva Muruganathan, Stittsville (CA); Shiwei Gao, Nepean (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 574 days.

(21) Appl. No.: 17/635,610

(22) PCT Filed: Aug. 14, 2020

(86) PCT No.: PCT/IB2020/057699
§ 371 (c)(1),
(2) Date: Feb. 15, 2022

(87) PCT Pub. No.: WO2021/033115
PCT Pub. Date: Feb. 25, 2021

(65) Prior Publication Data
US 2022/0312452 A1    Sep. 29, 2022

Related U.S. Application Data

(60) Provisional application No. 62/888,187, filed on Aug. 16, 2019.

(51) Int. Cl.
*H04W 72/1273*    (2023.01)
*H04L 1/00*    (2006.01)
(Continued)

(52) U.S. Cl.
CPC ....... *H04W 72/1273* (2013.01); *H04L 1/0067* (2013.01); *H04L 5/0051* (2013.01); *H04W 72/23* (2023.01)

(58) Field of Classification Search
CPC ..... H04L 1/0067; H04L 5/005; H04L 5/0051; H04W 72/0446; H04W 72/0453; H04W 72/1273; H04W 72/23; H04W 72/232
See application file for complete search history.

(56) References Cited

U.S. PATENT DOCUMENTS 12,156,204 B2 *  11/2024  Muruganathan ...... H04L 5/0094
2011/0317657 A1    12/2011  Chmiel et al.
(Continued)

FOREIGN PATENT DOCUMENTS

CN    105007600 A    10/2015
CN    106301737 A    1/2017

OTHER PUBLICATIONS

International Search Report and Written Opinion dated Nov. 10, 2020 issued in PCT Application No. PCT/IB2020/057699, consisting of 15 pages.
(Continued)

*Primary Examiner* — Marcus Smith
*Assistant Examiner* — Kai Chang
(74) *Attorney, Agent, or Firm* — Weisberg I.P. Law, P.A.

(57) ABSTRACT

A method and apparatus are disclosed for rate matching. In one embodiment, a user equipment is configured to receive at least two physical downlink shared channels, PDSCHs; a first PDSCH of the at least two PDSCHs being associated with a first set of cell-specific reference signal, CRS, patterns and a second PDSCH of the at least two PDSCHs being associated with a second set of CRS patterns; and the at least two PDSCHs being rate matched around at least one of the first set of CRS patterns and the second set of CRS patterns.

(Continued)

In another embodiment, a network node is configured to transmit the at least one PDSCH of at the least two PDSCHs; and the at least two PDSCHs being rate matched around at least one of the first set of CRS patterns and the second set of CRS patterns.

17 Claims, 18 Drawing Sheets

(51) Int. Cl.
  *H04L 5/00* (2006.01)
  *H04W 72/23* (2023.01)

(56) References Cited

U.S. PATENT DOCUMENTS

| | | | | |
|---|---|---|---|---|
| 2014/0064135 | A1* | 3/2014 | Chen | H04B 7/024 370/328 |
| 2014/0126490 | A1* | 5/2014 | Chen | H04L 5/0035 370/328 |
| 2019/0045490 | A1 | 2/2019 | Davydov et al. | |
| 2019/0150124 | A1* | 5/2019 | Nogami | H04L 5/0044 370/330 |
| 2022/0021482 | A1* | 1/2022 | Wang | H04W 72/0453 |
| 2022/0131642 | A1* | 4/2022 | Kim | H04L 5/005 |
| 2022/0150011 | A1* | 5/2022 | Kim | H04L 1/00 |
| 2022/0304039 | A1* | 9/2022 | Jiang | H04W 72/23 |

OTHER PUBLICATIONS

Written Opinion of the International Preliminary Examining Authority dated Jul. 20, 2021 issued in PCT Application No. PCT/IB2020/057699, consisting of 5 pages.
International Preliminary Report on Patentability dated Dec. 6, 2021 issued in PCT Application No. PCT/IB2020/057699, consisting of 25 pages.
ETSI TS 138 212 V15.5.0 (May 2019) Technical Specification; 5G; NR; Multiplexing and Channel Coding (3GPP TS 38.212 Version 15.5.0 Release 15), consisting of 104 pages.
ETSI TS 138 211 V15.5.0 (Apr. 2019) Technical Specification; 5G; NR; Physical Channels and Modulation (3GPP TS 38.211 Version 15.5.0 Release 15), consisting of 98 pages.
R1-1902540; 3GPP TSG RAN WG1 Meeting #96; Source: Ericsson; Title: On Multi-TRP and Multi-Panel; Agenda Item: 7.2.8.2; Document for: Discussion and Decision; Athens, Greece, Feb. 25-Mar. 1, 2019, consisting of 11 pages.
R1-1904750; 3GPP TSG RAN WG1 Meeting #96-bis; Source: Ericsson; Title: On Multi-TRP and Multi-Panel; Agenda Item: 7.2.8.2; Document for: Discussion and Decision; Xi'an, China, Apr. 8-12, 2019, consisting of 18 pages.
R1-1910582; 3GPP TSG RAN WG1 Meeting #98bis; Source: LG Electronics; Title: Enhancements on Multi-TRP/Panel Transmission; Agenda Item: 7.2.8.2; Document for: Discussion and Decision; Chongqing, China, Oct. 14-20, 2019, consisting of 23 pages.
R1-1910865; 3GPP TSG RAN WG1 Meeting #98bis; Source: Ericsson; Title: Remaining Issues for mTRP; Agenda Item: 7.2.8.2; Document for: Discussion and Decision; Chongqing, China, Oct. 14-20, 2019, consisting of 15 pages.
R1-1911425; 3GPP TSG RAN WG1 Meeting #98bis; Source: Huawei, HiSilicon; Title: Feature Summary of Enhancements on Multi-TRP/Panel Transmission; Agenda Item: 7.2.8.2; Document for: Discussion and Decision; Chongqing, China, Oct. 14-20, 2019, consisting of 100 pages.
Japanese Office Action with English Summary translation dated Apr. 21, 2023 for Japanese Patent Application No. 2022505636, consisting of 6-pages.
3GPP TSG RAN WG1 Meeting #96 R1-1901567; Title: Enhancements on Multi-TRP/panel transmission; Agenda Item: 7.2.8.2; Source: Huawei, HiSilicon; Document for: Discussion and Decision; Date and Location: Feb. 25-Mar. 1, 2019, Athens, Greece, consisting of 14-pages.
3GPP TSG RAN WG1 Meeting #96bis R1-1903970; Title: Enhancements on Multi-TRP/panel transmission; Agenda Item: 7.2.8.2; Source: Huawei, HiSilicon; Document for: Discussion and Decision; Date and Location: Apr. 8-12, 2019, Xi'an, China, consisting of 20-pages.
3GPP TSG RAN WG1 Meeting #96bis R1-1904313; Title: On multi-TRP/multi-panel transmission; Agenda Item: 7.2.8.2; Source: Intel Corporation; Document for: Discussion and Decision; Date and Location: Apr. 8-12, 2019, Xi'an, China, consisting of 17-pages.
3GPP TSG RAN WG1 Meeting #96b R1-1905026; Title: Multi-TRP Enhancements; Agenda Item: 7.2.8.2; Source: Qualcomm Incorporated; Document for: Discussion/Decision; Date and Location: Apr. 8-12, 2019, Xi'an, China, consisting of 29-pages.
3GPP TSG RAN WG1 Meeting #96bis R1-1905523; Title: Enhancements on Multi-TRP/panel transmission; Agenda Item: 7.2.8.2; Source: Huawei, HiSilicon; Document for: Discussion and Decision; Date and Location: Apr. 8-12, 2019, Xi'an, China, consisting of 22-pages.
3GPP TSG RAN WG1 #97 R1-1907529; Title: Rate matching for multi-TRP transmission for eMBB; Agenda Item: 7.2.8.5; Source: Huawei, HiSilicon; Document for: Discussion and Decision; Date and Location: May 13-17, 2019, Reno, USA, consisting of 4-pages.
3GPP TSG-RAN WG2 #107 Tdoc R2-1910143; Title: Protocol structure for Multi-TRP operation with multi-PDCCH/PDSCH; Agenda Item: 11.16 (NR_eMIMO-Core); Source: Ericsson; Document for: Discussion, Decision; Date and Location: Aug. 26-30, 2019, Prague, Czech Republic, consisting of 10-pages.
3GPP TSG RAN WG1 Meeting RAN1#97 R1-1907697; Title: On multi-TRP and multi-panel; Agenda Item: 7.2.8.2; Source: Ericsson; Document for: Discussion and Decision; Date and Location: May 13-17, 2019, Reno, US, consisting of 24-pages.
European Communication and Search Report dated May 3, 2023 for Application No. 20 761 317.5, consisting of 5 pages.
3GPP TSG RAN WG1 Meeting #97 R1-1907706; Title: Summary of AI: 7.2.8.2 Enhancements on Multi-TRP/Panel Transmission of Offline Discussion; Agenda Item: 7.2.8.2; Source: Huawei, HiSilicon; Document for: Discussion and decision; Location and Date: Reno, USA, May 13-17, 2019, consisting of 66 pages.
3GPP TSG-RAN WG1 Meeting #97 R1-1907289; Title: Multi-TRP Enhancements; Agenda Item: 7.2.8.2; Source: Qualcomm Incorporated; Document for: Discussion/Decision; Location and Date: Reno, Nevada, USA, May 13-17, 2019, consisting of 25 pages.
Chinese Office Action and English Summary dated Jul. 28, 2023 for Application No. 202080057960.5, consisting of 10 pages.
3GPP TSG RAN WG1 Meeting #94 R1-1809430; Title: Maintenance for PDSCH rate matching and TA; Agenda item: 7.1.3.5; Source: Qualcomm Incorporated; Document for: Discussion and Decision; Location and Date: Gothenburg, Sweden, Aug. 20-Aug. 24, 2018, consisting of 8 pages.

* cited by examiner

Data to UE1

RS to UE2

RS to UE2

RS to UE2

Front loaded Type 1

1 symbol

Comb 2 + 2CS 2 symbols

Comb 2 + 2CS + T-OCC {1,1} {1,-1}

Front loaded Type 2

RATE MATCHING FOR NON-COHERENT JOINT-TRANSMISSION WITH DYNAMIC SPECTRUM SHARING

CROSS-REFERENCE TO RELATED APPLICATIONS

This application is a Submission Under 35 U.S.C. § 371 for U.S. National Stage Patent Application of International Application No.: PCT/IB2020/057699, filed Aug. 14, 2020 entitled "RATE MATCHING FOR NON-COHERENT JOINT-TRANSMISSION WITH DYNAMIC SPECTRUM SHARING," which claims priority to U. S. Provisional Application No.: 62/888,187, filed Aug. 16, 2019, entitled "RATE MATCHING FOR NC-JT WITH DYNAMIC SPECTRUM SHARING," the entireties of both of which are incorporated herein by reference.

TECHNICAL FIELD

The present disclosure relates to wireless communication and in particular, to rate matching for Non-coherent Joint-Transmission (NC-JT) with dynamic spectrum sharing.

BACKGROUND

New Radio (NR) Frame Structure and Resource Grid

The $3^{rd}$ Generation Partnership Project (3GPP) New Radio (NR) (also referred to as "5G") wireless communication standard uses CP-OFDM (Cyclic Prefix Orthogonal Frequency Division Multiplexing) in both the downlink (i.e., from a network node, gNB, or base station, to a user equipment or UE) and the uplink (e.g., from UE to network node, gNB, etc.). Discrete Fourier Transform (DFT) spread orthogonal frequency division multiplexing (OFDM) is also supported in the uplink. In the time domain, NR downlink and uplink are organized into equally-sized subframes of 1 millisecond (ms) each. A subframe is further divided into multiple slots of equal duration. The slot length depends on subcarrier spacing. For example, for subcarrier spacing of $\Delta f=15$ kHz, there is only one slot per subframe and each slot includes 14 OFDM symbols.

Data scheduling in NR is typically on a slot basis (an example is shown in FIG. 1 with a 14-symbol slot) where the first one, two or three symbols contain physical downlink control channel (PDCCH) and the remainder contains physical shared channel data, either PDSCH (physical downlink shared channel) or PUSCH (physical uplink shared channel).

Different subcarrier spacing values are supported in NR. The supported subcarrier spacing values (also referred to as different numerologies) are given by $\Delta f=(15\times 2^{\mu})$ kHz where $\mu \in 0,1,2,3,4$. $\Delta f=15$ kHz is the basic subcarrier spacing. The slot durations at different subcarrier spacings is given by $$\frac{1}{2^{\mu}} \text{ ms.}$$

In the frequency domain, a system bandwidth is divided into resource blocks (RBs), each corresponding to 12 contiguous subcarriers. The RBs are numbered starting with 0 from one end of the system bandwidth. An example of the basic NR physical time-frequency resource grid is illustrated in FIG. 2, where only one resource block (RB) within a 14-symbol slot is shown. One OFDM subcarrier during one OFDM symbol interval forms one resource element (RE).

Downlink transmissions are dynamically scheduled, i.e., in each slot the network node (e.g., gNB) transmits downlink control information (DCI) over PDCCH (Physical Downlink Control Channel) about which wireless device (WD) (also referred to as user equipment or UE) data is to be transmitted to and which RBs in the current downlink slot the data is transmitted on. The WD data are carried on PDSCH.

QCL and TCI States

Several signals can be transmitted from the same base station antenna from different antenna ports. These signals can have the same large-scale properties when measured by the receiver, for instance in terms of Doppler shift/spread, average delay spread, or average delay. These antenna ports are then said to be quasi co-located (QCL).

The network can then signal to the WD that two antenna ports are QCL. If the WD knows that two antenna ports are QCL with respect to a certain parameter (e.g., Doppler spread), the WD can estimate that parameter based on reference signals transmitted from one of the antenna ports and use that estimate when receiving a reference signal transmitted on the other antenna port. Typically, the first antenna port is represented by a wideband measurement reference signal such as channel state information-reference signal (CSI-RS) (also known as source RS) and the second antenna port is a (possible narrowband) demodulation reference signal (DMRS) (known as target RS).

For instance, if antenna ports A and B are QCL with respect to average delay, the WD can estimate the average delay from the signal received from antenna port A (known as the source reference signal (RS)) and assume that the signal received from antenna port B (target RS) has the same average delay. This is useful for demodulation since the WD can know beforehand the properties of the channel when trying to measure the channel utilizing the DMRS, which may help the WD in for instance selecting an appropriate channel estimation filter.

Information about what assumptions can be made regarding QCL is signaled to the WD from the network (e.g., network node). In NR, four types of QCL relations between a transmitted source RS and transmitted target RS were defined:

Type A: {Doppler shift, Doppler spread, average delay, delay spread};
Type B: {Doppler shift, Doppler spread};
Type C: {average delay, Doppler shift}; and
Type D: {Spatial Rx parameter}.

To introduce dynamics in beam and transmission point (TRP) selection, the WD can be configured through radio resource control (RRC) signalling with N different transmission configuration indication (TCI) states, where N is up to 128 in frequency range 2 (FR2) and up to 8 in FR1, depending on WD capability.

Each TCI state includes QCL information, i.e., it contains a pointer to one or two source DL RSs, plus for each source RS an associated QCL type. For example, a TCI state contains a pair of reference signals, each associated with a QCL type, e.g., two different CSI-RSs {CSI-RS1, CSI-RS2} is configured in the TCI state as {qcl-Type1,qcl-Type2}={Type A, Type D}. This means the WD can derive Doppler shift, Doppler spread, average delay, delay spread from CSI-RS1 and Spatial Rx parameter (i.e. the receiver (RX) beam to use) from CSI-RS2.

An equivalent interpretation is that each of the N states in the list of TCI states can be assumed as a list of N possible TRPs used by the network node to communicate with the WD.

A first list of available TCI states is configured for physical downlink shared channel (PDSCH), and a second list of TCI states for physical downlink control channel (PDCCH) includes pointers, known as TCI State identifiers (IDs), to a subset of the TCI states configured for PDSCH. The network node then activates one TCI state for PDCCH (i.e., provides a TCI for PDCCH) and up to eight active TCI states for PDSCH. The number of active TCI states the WD supports is a WD capability, but the maximum is 8 in NR Release-15 (Rel-15). The TCI state(s) used for a PDSCH, i.e., the TRP to use for a PDSCH transmission, is dynamically indicated in downlink control information (DCI) so that the WD can adjust its receiver filter accordingly.

Each configured TCI state includes parameters for the quasi co-location associations between source reference signals (CSI-RS or synchronization signal block (SSB)) and target reference signals (e.g., PDSCH/PDCCH DMRS ports). Configured TCI states are also utilized to convey QCL information for the reception of CSI-RS.

In Release-15 NR, a threshold Threshold-Sched-Offset is reported by the WD based on the WD's capability. The WD may receive in the DCI scheduling the PDSCH an indication of the TCI state and an indication of the time offset between the reception of that DL DCI and the corresponding scheduled PDSCH.

If the TCI state is indicated in DCI scheduling the PDSCH, the WD uses the indicated TCI state for determining the PDSCH DMRS antenna ports' quasi co-location when the time offset between the reception of the DL DCI and the corresponding PDSCH is equal to greater than the threshold Threshold-Sched-Offset. When the time offset between the reception of the DL DCI and the corresponding PDSCH is less than the threshold Threshold-Sched-Offset, the WD may assume that the PDSCH DMRS antenna port(s) are quasi-collocated with the RS(s) in the TCI state activated for PDCCH if any of the configured TCI states includes 'QCL-TypeD'. If none of the configured TCI states includes 'QCL-TypeD', the WD uses the indicated TCI state in the DCI scheduling PDSCH for determining the PDSCH DMRS antenna ports' quasi co-location irrespective of the time offset between the reception of the DL DCI and the corresponding PDSCH.

NR MIMO Data Transmission

NR data transmission over multiple multiple-input multiple-output (MIMO) layers is shown in FIG. 3 as an example. Depending on the total number of MIMO layers or the rank, either one codeword (CW) or two codewords is used. In NR Release-15, one codeword is used when the total number of layers is equal to or less than 4, two codewords are used when the number of layers is more than 4. Each codeword contains the encoded data bits of a transport block (TB). After bit level scrambling, the scrambled bits are mapped to complex-valued modulation symbols $d^{(q)}(0), \ldots, d^{(q)}(M_{symb}^{(q)}-1)$ for codeword $q$, $q \in (0,1)$. The complex-valued modulation symbols are then mapped onto the v layers as $x(i)=[x^{(0)}(i) \ldots x^{(v-1)}(i)]^T$, $i=0,1, \ldots, M_{symb}^{layer}-1$, according to Table 7.3.1.3-1 of 3GPP Technical Specification (TS) 38.211 v15.5.0.

FIG. 3 illustrates an example NR MIMO data transmission over multiple antennas in case of more than four layer transmission. In case of one to four layer transmission, only a single transport block (TB1) and thus a single Codeword, is transmitted.

For demodulation purposes, a demodulation reference signal (DMRS), also referred to as a DMRS port, is transmitted along with each data layer. The block of vectors $[x^{(0)}(i) \ldots x^{(v-1)}(i)]^T$, $i=0,1, \ldots, M_{symb}^{layer}-1$ may be mapped to DMRS antenna ports according to:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix},$$

where $i=0,1, \ldots, M_{symb}^{ap}-1$, $M_{symb}^{ap}=M_{symb}^{layer}$. The set of DMRS antenna ports $\{p_0, \ldots, p_{v-1}\}$ and port to layer mapping are dynamically indicated in DCI according to Tables 7.3.1.2.2-1/2/3/4 in 3GPP TS 38.212 v15.5.0.

Rate Matching

A WD is typically scheduled to receive data in a contiguous time-frequency range, i.e., for a certain period of time (e.g., a slot) and a certain frequency range (e.g., over one or multiple physical resource blocks (PRBs) where one resource block (RB) is 12 subcarriers). However, in many cases, all of the resources in this contiguous time-frequency range cannot be reserved for data to one WD: it is common that some of the resources are occupied by reference signals to either the scheduled WD or to other WDs. An example of this situation is depicted in FIG. 4 which illustrates an example of a resource element grid, where some of the resource elements (REs) are occupied by data to WD1, whereas other resource elements are occupied by reference signals to different, other WDs (e.g., WD2 and WD3).

To decode the data, the network node transmitter and the receiving WD should know which REs include data, and which REs do not in order to make proper PDSCH to RE mapping at the transmitter and corresponding de-mapping at the receiver. This can be achieved by the WD applying so called rate-matching when mapping the PDSCH (or in general, any other downlink physical channel), which means that the WD is informed which REs do not contain data but may contain something else.

Thus, generally, the scheduled WD knows which REs contain reference signals it has been configured with (otherwise the WD cannot use the reference signals for measurements), and then it is in many cases stated in the standard that the WD can assume that there is no data in these REs.

In NR, this holds for periodic non-zero power channel state information reference signals (NZP CSI-RS). An exception is aperiodic NZP CSI-RS, in which the WD should not assume PDSCH is rate matched around, however, when such aperiodic RS are triggered, the network node can configure a zero power (ZP) CSI-RS that overlaps with the periodic NZP CSI-RS and hence, the PDSCH will be rate matched around the ZP CSI-RS, effectively creating a rate matching around aperiodic NZP CSI-RS.

To inform the WD about REs that are unavailable for data due to other factors, such as reference signals intended for other WDs, the network node configures the WD with specific rate-matching patterns. The rate-matching patterns essentially provides the WD with 2-dimensional bitmaps that indicate which REs are unavailable for data. The WD then combines information about the reference signal transmissions it is aware of, with the explicitly signaled rate-matching patterns.

In MIMO transmission, a RE may contain up to 8 layers. In NR, if a RE is unavailable for PDSCH to RE mapping, then the PDSCH transmission of X layers is not mapped to any of the X layers of that RE.

DMRS Configuration

Demodulation reference signals (DM-RS) are used for coherent demodulation of physical layer data channels, PDSCH (DL) and PUSCH (UL), as well as of physical layer downlink control channel (PDCCH). The DM-RS may be confined to resource blocks carrying the associated physical layer channel and is mapped on allocated resource elements of the OFDM time-frequency grid such that the receiver can efficiently handle time/frequency-selective fading radio channels.

The mapping of DM-RS to resource elements is configurable in both frequency and time domain, with two mapping types in the frequency domain (configuration type 1 or type 2) and two mapping types in the time domain (mapping type A or type B) defining the symbol position of the first DM-RS within a transmission interval. The DM-RS mapping in time domain can further be single-symbol based, or double-symbol based where the latter means that DM-RS is mapped in pairs of two adjacent symbols. Furthermore, a WD can be configured with one, two, three or four single-symbol DM-RS and one or two double-symbol DM-RS. In scenarios with low Doppler, it may be sufficient to configure front-loaded DM-RS only, i.e. one single-symbol DM-RS or one double-symbol DM-RS, whereas in scenarios with high Doppler additional DM-RS may be required.

FIG. 5 shows examples of the mapping of front-loaded DM-RS for configuration type 1 and type 2 with single-symbol and double-symbol DM-RS and for the mapping type A with first DM-RS in third symbol of a transmission interval of 14 symbols. We observe from this figure that type 1 and type 2 differs with respect to both the mapping structure and the number of supported DM-RS code division multiplexing (CDM) groups where type 1 support 2 CDM groups and Type 2 support 3 CDM groups. FIG. 5 illustrates an example of a front-loaded DM-RS for configuration type 1 and type 2 where different CDM groups indicated by different colors.

A DM-RS antenna port may be mapped to the resource elements within one CDM group only. For single-symbol DM-RS, two antenna ports can be mapped to each CDM group whereas for double-symbol DM-RS four antenna ports can be mapped to each CDM group. Hence, the maximum number of DM-RS ports for DM-RS type 1 is either four or eight. The maximum number of DM-RS ports for DM-RS type 2 is either six or twelve. An orthogonal cover code (OCC) of length 2 ([+1, +1], [+1, −1]) is used to separate antenna ports mapped on same resource elements within a CDM group. The OCC is applied in frequency domain as well as in time domain when double-symbol DM-RS is configured.

In 3GPP NR Rel-15, the mapping of a PDSCH DM-RS sequence r(m), m=0,1, ... on antenna port $p_j$ and subcarrier k in OFDM symbol l for the numerology index μ is specified in TS 38.211 as, $$a_{k,l}^{(p_j,\mu)} = \beta_{DMRS}^{PDSCH} r_\lambda^{(p_j)}(2n+k')$$

-continued $$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

where $r_\square^{(p_j)}(2n+k') = w_f(k')w_t(l')r(2n+k')$, represents the reference signal mapped on port $p_j$ in CDM group □ after applying OCC in frequency domain, $w_f(k')$, and time domain, $w_t(l')$. Table 1 Table 1 and Table 2 Table 2, below, show the PDSCH DM-RS mapping parameters for configuration type 1 and type 2, respectively.

TABLE 1

PDSCH DM-RS mapping parameters for configuration type 1.

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 2

PDSCH DM-RS mapping parameters for configuration type 2.

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

For PDSCH mapping type A, DM-RS mapping is relative to a slot boundary. That is, the first front-loaded DM-RS symbol in DM-RS mapping type A is in either the $3^{rd}$ or $4^{th}$ symbol of the slot. In addition to the front-loaded DM-RS, type A DM-RS mapping can include up to 3 additional DM-RS. Some examples of DM-RS for mapping type A are shown in FIG. 6 (note that PDSCH length of 14 symbols is assumed in the examples).

FIG. 6 illustrates examples of DM-RS configurations for PDSCH Mapping Type A. The figure assumes that the PDSCH duration is the full slot. If the scheduled PDSCH duration is shorter than the full slot, the positions of the DMRS changes according to the specification TS 38.211. The darker shaded symbols are DMRS.

For PDSCH mapping type B, DM-RS mapping is relative to a transmission start. That is, the first DM-RS symbol in DM-RS mapping type B is in the first symbol in which type B PDSCH starts. Some examples of DM-RS for mapping type A are shown in FIG. 7. The darker shaded symbols are DMRS.

Non-Coherent Joint Transmission (NC-JT) Over Multiple Transmission Points or Panels (TRP)

NC-JT refers to MIMO data transmission over multiple TRPs in which different MIMO layers are transmitted over different TRPs. An example is shown in FIG. 8, where data is sent to a WD over two TRPs, each TRP carrying one TB mapped to one code word. When the WD has 4 receive antennas while each of the TRPs has only 2 transmit antennas, the WD can support up to 4 MIMO layers but each TRP can maximally transmit 2 MIMO layers. In this case, by transmitting data over two TRPs to the WD, the peak data rate to the WD can be increased because up to 4 aggregated layers from the two TRPs can be used. This can be particularly beneficial when the traffic load and thus the resource utilization is low in each TRP. In this example, a single scheduler is used to schedule data over the two TRPs. One PDCCH is transmitted from each of the two TRPs in a slot, each PDCCH scheduling one PDSCH.

This is referred to as a multi-PDCCH or multi-DCI scheme in which a WD receives two PDCCHs and the associated two PDSCHs may be in the same slot or different slots from two TRPs. Note that the example in FIG. 8 shows that the two PDSCHs scheduled by the two PDCCHs are received in the same slot. However, the multiple PDCCH scheme can also be applied to the case where the two PDSCHs are scheduled in different slots.

In another scenario shown in FIG. 9, independent schedulers are used in each TRP. In this case, only semi-static to semi-dynamic coordination between the two schedulers can be performed due to the non-ideal backhaul depicted in FIG. 8, i.e., backhaul with large delay and/or delay variations which are comparable to the cyclic prefix length or in some cases even longer, up to several milliseconds.

In NC-JT, and when the backhaul is very fast, close to ideal, it is possible to use NC-JT with a single PDCCH solution. Here, the WD receives a single PDCCH that schedules a single PDSCH but where the MIMO layers of the PDSCH is split into two groups. The first group of layers are transmitted from a first TRP and the second group of layers is transmitted from a second TRP. In this case, the WD may need to be aware of the two TCI states, hence the DCI signaling framework is extended so that the WD can receive a TCI codepoint which includes two TCI states, one associated with each TRP, respectively. In this case, it has been considered that the layers of the first and second group is using DMRS from two different CDM groups. At least some of the reasons are elaborated in the next section.

QCL Relation to DMRS CDM Groups

In NR specification 3GPP TS 38.211, there is a restriction stating: "The UE [WD] may assume that the PDSCH DM-RS within the same CDM group are quasi co-located with respect to Doppler shift, Doppler spread, average delay, delay spread, and spatial Rx."

In cases where a WD is not scheduled using all DMRS ports within a CDM group, there may be another WD simultaneously scheduled, using the remaining ports of that CDM group. The WD can then estimate the channel for that other WD (thus an interfering signal) in order to perform coherent interference suppression. Hence, this is useful in multi-user MIMO (MU-MIMO) scheduling and WD interference suppression.

In cases of multi-TRP scenarios, in which the WD receives PDSCHs (or different layers from one PDSCH) transmitted from different TRPs, the signals transmitted from different TRPs will most likely not be quasi-collocated as the TRPs may be spatially separated. In this case, the layers transmitted from different TRPs may have different TCI states associated with them.

Furthermore, according to the above restriction, PDSCH DM-RSs associated with two TRPs will belong to different DM-RS CDM groups (as the DM-RSs are not QCL, they cannot belong to the same DM-RS CDM group). FIG. 10 illustrates an example relationship between TCI states and DM-RS CDM groups for a multiple-PDCCH multi-TRP scenario. In the example, PDSCH1 is associated with TCI State p, and PDSCH 2 is associated with TCI state q. The PDSCH DM-RSs from the different TRPs also belong to different DM-RS CDM groups as they are not quasi-collocated. In the example, the DMRS for PDSCH1 belongs to CDM group u while the DMRS for PDSCH2 belongs to CDM group v.

Control Resource Sets (CORESETs)

A PDCCH includes one or more control-channel elements (CCEs) as indicated in Table 3Table 3 below. A CCE includes 6 resource-element groups (REGs) where a REG equals one resource block (RB) during one OFDM symbol.

TABLE 3

NR supported PDCCH aggregation levels.

| Aggregation level | Number of CCEs |
|---|---|
| 1 | 1 |
| 2 | 2 |
| 4 | 4 |
| 8 | 8 |
| 16 | 16 |

A set of PDCCH candidates for a WD to monitor is defined in terms of PDCCH search space sets. A search space set can be a Common Search Space (CSS) set or a WD Specific Search Space (USS) set. A WD can be configured with up to 10 sets of search spaces per bandwidth part for monitoring PDCCH candidates.

A search space set is defined over a Control Resource Set (CORESET). A CORESET includes $N_{RB}^{CORESET}$ resource blocks in the frequency domain and $N_{symb}^{CORESET} \in \{1,2,3\}$ consecutive OFDM symbols in the time domain. In NR Release-15, a WD can be configured with up to 3 CORESETs per bandwidth part. For each CORESET, a WD is configured by RRC (Radio Resource Control) signaling with CORESET information element (IE), which includes the following:
 a CORESET index p, $0 \leq p < 12$;
 a DM-RS scrambling sequence initialization value;
 a precoder granularity for a number of REGs in the frequency domain where the WD can assume use of a same DM-RS (DeModulation Reference Signal) precoder;
 a number of consecutive symbols;
 a set of resource blocks;
 CCE-to-REG mapping parameters;

a list of up to 64 TCI-States can be configured in a CORESET p. These TCI states are used to provide QCL relationships between the source DL RS(s) in one RS Set in the TCI State and the PDCCH DMRS ports (i.e., for DMRS ports for PDCCHs received in one of the search spaces defined over CORESET p). The source DL RS(s) can either be a CSI-RS or SSB; and an indication (given by the higher layer parameter tci-PresentInDCI field) for a presence or absence of a transmission configuration indication (TCI) field for DCI format 1_1 transmitted by a PDCCH in CORESET p.

A WD first detects and decodes PDCCH and if the decoding is successful, the WD then decodes the corresponding PDSCH based on the decoded control information in the PDCCH. When a PDSCH is successfully decoded, the HARQ (Hybrid ARQ) ACK is sent to the network node (e.g., gNB) over PUCCH (Physical Uplink Control Channel). Otherwise, a HARQ NACK is sent to the network node (e.g., gNB) over PUCCH so that data can be retransmitted to the WD. If PUCCH overlaps with a PUSCH transmission, HARQ feedback can also be conveyed on PUSCH.

Uplink data transmissions are also dynamically scheduled using PDCCH. Similar to downlink, a WD first decodes uplink grants in PDCCH and then transmits data over PUSCH based the decoded control information in the uplink grant such as modulation order, coding rate, uplink resource allocation, etc.

Dynamic Spectrum Sharing (DSS)

With reference to FIG. 11, it is possible to operate a NR carrier and LTE carrier in the same frequency band, thereby sharing the carrier dynamically. The terminals connected to LTE carrier are unaware that there is a potential NR transmission when there is no ongoing LTE transmission or in other physical RBs not used for the LTE reception. The terminals connected to the NR carrier can on the other hand be configured to be aware of a potential overlap with an LTE carrier. Since the LTE cell specific reference signals (CRS) cannot be disabled, they are transmitted in every slot, and the NR slot will not be empty even if there is no LTE traffic.

Hence, when LTE and NR use the same subcarrier spacing, e.g., 15 kHz, NR provides signaling of the positions of the CRS to the NR WD, using at least the RRC parameters lte-CRS-ToMatchAround for the CRS positions and nrofCRS-Ports for the number of CRS ports (1,2 or 4).

This allows coexistence of LTE and NR on the same carrier since NR PDSCH can be mapped around (i.e., rate matched) the LTE CRS. However, the synchronization signals and physical broadcast channel (PBCH) channels (synchronization signal block or SSB), PDCCH, CSI-RS and DMRS are not allowed/not preferred to collide with the resources indicated by lte-CRS-ToMatchAround.

In order to quickly deploy a nationwide NR network, it may be useful to deploy NR at low or mid-band spectrum. However, most low and mid-band spectrum are already allocated to LTE. Spectrum refarming of the LTE spectrum is not suitable since most of the traffic and available terminals in the recent coming years are still largely based on LTE.

Therefore, a solution to let NR and LTE dynamically share the spectrum in low and mid-band without affecting current LTE user service is seen as beneficial. This is called dynamic spectrum sharing.

In LTE, the CRS positions in downlink (DL) subframes are dense and occupy resource elements symbols with symbol indices 0, 4, 7 and 11 when 2 CRS ports are configured (denoted as LTE CRS port 0 and 1). In case 4 CRS ports are configured, the CRS occupy symbols with symbol indices 0, 1, 4, 7, 8 and 11.

A CRS port may occupy every 6th subcarrier, for 2 or more CRS ports the CRS will then occupy every 3rd subcarrier since odd and even ports are frequency interlaced by an offset of 3 subcarriers. In addition, the grid of CRS RE can be shifted in subcarrier offset by up to 5 subcarriers.

SUMMARY

Some embodiments advantageously provide methods and apparatuses for rate matching for Non-coherent Joint-Transmission (NC-JT) with dynamic spectrum sharing.

In one embodiment, a network node is configured to transmit the one or more PDSCHs according to a PDSCH resource mapping, the PDSCH resource mapping based at least in part on a first cell-specific reference signal (CRS) pattern and/or a second CRS pattern, the first CRS pattern and the second CRS pattern being associated with the first set of layers and the second set of layers, respectively.

In another embodiment, a network node is configured to transmit a downlink control information (DCI), the DCI comprising a transmission configuration indication (TCI) field indicating a TCI codepoint, the TCI codepoint indicating a first and a second TCI state, the first TCI state being associated with the first TRP and the second TCI state being associated with the second TRP; and/or transmit the PDSCH according to a rate matching, the rate matching associated with the indicated TCI codepoint by the TCI codepoint indicating whether either only the first set of CRS patterns or both the first set of CRS patterns and the second set of CRS patterns are used for the rate matching around the first set of layers.

In one embodiment, a wireless device (WD) is configured to receive the one or more PDSCHs according to a PDSCH resource mapping, the PDSCH resource mapping based at least in part on a first cell-specific reference signal (CRS) pattern and/or a second CRS pattern, the first CRS pattern and the second CRS pattern being associated with the first set of layers and the second set of layers, respectively.

In another embodiment, a WD is configured to receive a downlink control information (DCI), the DCI comprising a transmission configuration indication (TCI) field indicating a TCI codepoint, the TCI codepoint indicating a first and a second TCI state, the first TCI state being associated with the first TRP and the second TCI state being associated with the second TRP; determine, responsive to the indicated TCI codepoint, whether either only the first set of CRS patterns or both the first set of CRS patterns and the second set of CRS patterns are used for rate matching around the first set of layers; and/or receive the PDSCH according to the determined rate matching.

According to an aspect of the present disclosure, a method implemented in a user equipment, UE, is provided. The method includes receiving at least two physical downlink shared channels, PDSCHs; a first PDSCH of the at least two PDSCHs being associated with a first set of cell-specific reference signal, CRS, patterns, and a second PDSCH of the at least two PDSCHs being associated with a second set of CRS patterns; and the at least two PDSCHs being rate matched around at least one of the first set of CRS patterns and the second set of CRS patterns.

In some embodiments of this aspect, the first PDSCH is rate matched around resource elements associated with the first set of CRS patterns, and the second PDSCH is rate matched around resource elements associated with the second set of CRS patterns. In some embodiments of this aspect, the first PDSCH is rate matched around resource elements associated with the first and second sets of CRS patterns, and the second PDSCH is rate matched around resource elements associated with the first and second sets of CRS patterns. In some embodiments of this aspect, the at least two PDSCHs are associated with a first radio access technology, RAT, and the first and second sets of CRS patterns are associated with a second radio access technology, RAT.

In some embodiments of this aspect, the first RAT is New Radio, NR, and the second RAT is Long Term Evolution, LTE. In some embodiments of this aspect, the at least two PDSCHs are received in a same slot. In some embodiments of this aspect, the first PDSCH is transmitted by a first network node and the second PDSCH is transmitted by a second network node, the second network node being different from the first network node. In some embodiments of this aspect, the first PDSCH and the first set of CRS patterns are associated with at least one of a first transmission configuration indicator, TCI, state and a first code division multiplexing, CDM, group; and the second PDSCH and the second set of CRS patterns are associated with at least one of a second transmission configuration indicator, TCI, state and a second code division multiplexing, CDM, group.

In some embodiments of this aspect, the method includes receiving a configuration indicating the first and second sets of CRS patterns; and receiving a downlink control information, DCI, scheduling at least one the first and second PDSCHs, the DCI indicating the at least one of the first and second sets of CRS patterns in the configuration that the scheduled at least one the first and second PDSCHs are to be rate matched around. In some embodiments of this aspect, the first and second PDSCHs are scheduled by a first and a second DCIs, respectively. In some embodiments of this aspect, the first and the second DCIs are received in a first and a second Control resource Sets, CORESETs, respectively. In some embodiments of this aspect, the first and the second CORESETs are associated with the first and the second sets of CRS patterns, respectively. In some embodiments of this aspect, the first and second PDSCHs are scheduled by a same DCI.

According to another aspect of the present disclosure, a method implemented in a network node is provided. The method includes transmitting at least one physical downlink shared channel, PDSCH, of at least two physical downlink shared channels, PDSCHs; a first PDSCH of the at least two PDSCHs being associated with a first set of cell-specific reference signal, CRS, patterns and a second PDSCH of the at least two PDSCHs being associated with a second set of CRS patterns; and the at least two PDSCHs being rate matched around at least one of the first set of CRS patterns and the second set of CRS patterns.

In some embodiments of this aspect, the first PDSCH is rate matched around resource elements associated with the first set of CRS patterns, and the second PDSCH is rate matched around resource elements associated with the second set of CRS patterns. In some embodiments of this aspect, the first PDSCH is rate matched around resource elements associated with the first and second sets of CRS patterns, and the second PDSCH is rate matched around resource elements associated with the first and second sets of CRS patterns. In some embodiments of this aspect, the at least two PDSCHs are associated with a first radio access technology, RAT, and the first and second sets of CRS patterns are associated with a second radio access technology, RAT. In some embodiments of this aspect, the first RAT is New Radio, NR, and the second RAT is Long Term Evolution, LTE.

In some embodiments of this aspect, the at least two PDSCHs are transmitted in a same slot. In some embodiments of this aspect, the first PDSCH is transmitted by the network node and the second PDSCH is transmitted by a second network node, the second network node being different from the network node. In some embodiments of this aspect, the first PDSCH and the first set of CRS patterns are associated with at least one of a first transmission configuration indicator, TCI, state and a first code division multiplexing, CDM, group; and the second PDSCH and the second set of CRS patterns are associated with at least one of a second transmission configuration indicator, TCI, state and a second code division multiplexing, CDM, group.

In some embodiments of this aspect, the method further includes transmitting a configuration indicating the first and second sets of CRS patterns; and transmitting a downlink control information, DCI, scheduling at least one the first and second PDSCHs, the DCI indicating the at least one of the first and second sets of CRS patterns in the configuration that the scheduled at least one the first and second PDSCHs are to be rate matched around. In some embodiments of this aspect, the first and second PDSCHs are scheduled by a first and a second DCIs, respectively. In some embodiments of this aspect, the first and the second DCIs are received in a first and a second Control resource Sets, CORESETs, respectively. In some embodiments of this aspect, the first and the second CORESETs are associated with the first and the second sets of CRS patterns, respectively. In some embodiments of this aspect, the first and second PDSCHs are scheduled by a same DCI.

According to yet another aspect of the present disclosure, a user equipment, UE, configured to communicate with a network node is provided. The user equipment includes processing circuitry. The processing circuitry is configured to cause the user equipment to receive at least two physical downlink shared channels, PDSCHs; a first PDSCH of the at least two PDSCHs being associated with a first set of cell-specific reference signal, CRS, patterns and a second PDSCH of the at least two PDSCHs being associated with a second set of CRS patterns; and the at least two PDSCHs being rate matched around at least one of the first set of CRS patterns and the second set of CRS patterns.

In some embodiments of this aspect, the first PDSCH is rate matched around resource elements associated with the first set of CRS patterns, and the second PDSCH is rate matched around resource elements associated with the second set of CRS patterns. In some embodiments of this aspect, the first PDSCH is rate matched around resource elements associated with the first and second sets of CRS patterns, and the second PDSCH is rate matched around resource elements associated with the first and second sets of CRS patterns. In some embodiments of this aspect, the at least two PDSCHs are associated with a first radio access technology, RAT, and the first and second sets of CRS patterns are associated with a second radio access technology, RAT. In some embodiments of this aspect, the first RAT is New Radio, NR, and the second RAT is Long Term Evolution, LTE.

In some embodiments of this aspect, the at least two PDSCHs are received in a same slot. In some embodiments of this aspect, the first PDSCH is transmitted by a first network node and the second PDSCH is transmitted by a second network node, the second network node being different from the first network node. In some embodiments of this aspect, the first PDSCH and the first set of CRS patterns are associated with at least one of a first transmission configuration indicator, TCI, state and a first code division multiplexing, CDM, group; and the second PDSCH and the second sets of CRS patterns are associated with at least one of a second transmission configuration indicator, TCI, state and a second code division multiplexing, CDM, group.

In some embodiments of this aspect, the processing circuitry is further configured to cause the user equipment to: receive a configuration indicating the first and second sets of CRS patterns; and receive a downlink control information, DCI, scheduling at least one the first and second PDSCHs, the DCI indicating the at least one of the first and second sets of CRS patterns in the configuration that the scheduled at least one the first and second PDSCHs are to be rate matched around. In some embodiments of this aspect, the first and second PDSCHs are scheduled by a first and a second DCIs, respectively. In some embodiments of this aspect, the first and the second DCIs are received in a first and a second Control resource Sets, CORESETs, respectively. In some embodiments of this aspect, the first and the second CORESETs are associated with the first and the second sets of CRS patterns, respectively. In some embodiments of this aspect, the first and second PDSCHs are scheduled by a same DCI.

According to another aspect of the present disclosure, a network node configured to communicate with a user equipment, UE, is provided. The network node includes processing circuitry. The processing circuitry is configured to cause the network node to transmit at least one physical downlink shared channel, PDSCH, of at least two physical downlink shared channels, PDSCHs; a first PDSCH of the at least two PDSCHs being associated with a first set of cell-specific reference signal, CRS, patterns and a second PDSCH of the at least two PDSCHs being associated with a second set of CRS patterns; and the at least two PDSCHs being rate matched around at least one of the first set of CRS patterns and the second set of CRS patterns.

In some embodiments of this aspect, the first PDSCH is rate matched around resource elements associated with the first set of CRS patterns, and the second PDSCH is rate matched around resource elements associated with the second set of CRS patterns. In some embodiments of this aspect, the first PDSCH is rate matched around resource elements associated with the first and second sets of CRS patterns and the second PDSCH is rate matched around resource elements associated with the first and second sets of CRS patterns. In some embodiments of this aspect, the at least two PDSCHs are associated with a first radio access technology, RAT, and the first and second sets of CRS patterns are associated with a second radio access technology, RAT. In some embodiments of this aspect, the first RAT is New Radio, NR, and the second RAT is Long Term Evolution, LTE.

In some embodiments of this aspect, the at least two PDSCHs are transmitted in a same slot. In some embodiments of this aspect, the first PDSCH is transmitted by the network node and the second PDSCH is transmitted by a second network node, the second network node being different from the network node. In some embodiments of this aspect, the first PDSCH and the first set of CRS patterns are associated with at least one of a first transmission configuration indicator, TCI, state and a first code division multiplexing, CDM, group; and the second PDSCH and the second set of CRS patterns are associated with at least one of a second transmission configuration indicator, TCI, state and a second code division multiplexing, CDM, group.

In some embodiments of this aspect, the processing circuitry is further configured to cause the network node to transmit a configuration indicating the first and second sets of CRS patterns; and transmit a downlink control information, DCI, scheduling at least one the first and second PDSCHs, the DCI indicating the at least one of the first and second sets of CRS patterns in the configuration that the scheduled at least one the first and second PDSCHs are to be rate matched around. In some embodiments of this aspect, the first and second PDSCHs are scheduled by a first and a second DCIs, respectively. In some embodiments of this aspect, the first and the second DCIs are received in a first and a second Control resource Sets, CORESETs, respectively. In some embodiments of this aspect, the first and the second CORESETs are associated with the first and the second sets of CRS patterns, respectively. In some embodiments of this aspect, the first and second PDSCHs are scheduled by a same DCI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
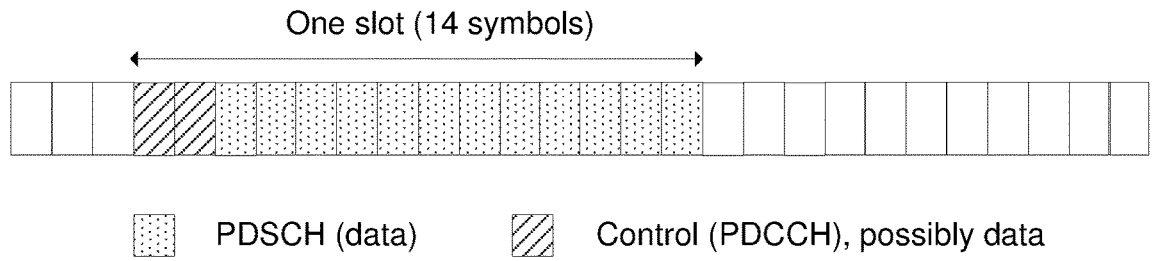
FIG. 1 illustrates an example of NR time-domain structure with 15 kHz subcarrier spacing.
Figure 2:
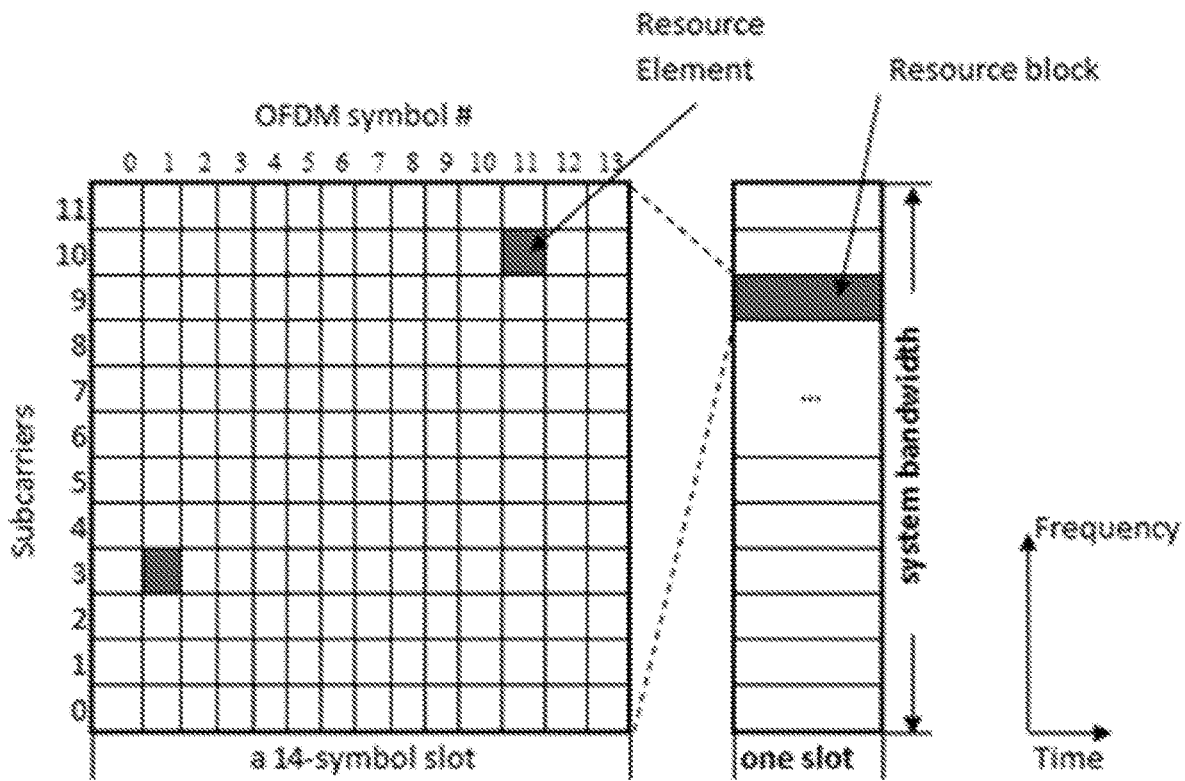
FIG. 2 illustrates an example of an NR physical resource grid.
Figure 3:
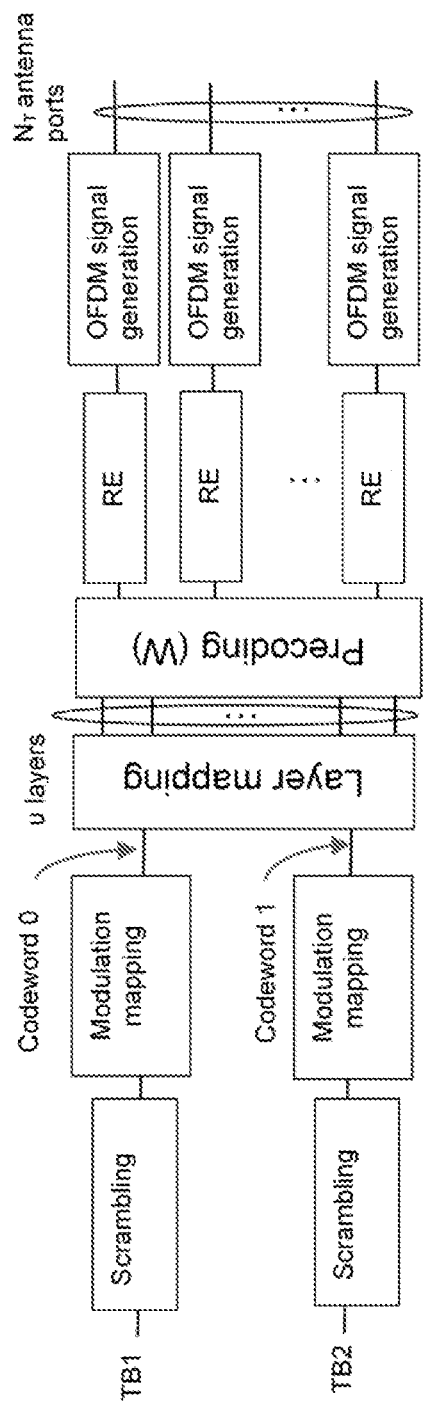
FIG. 3 illustrates an example of NR MIMO data transmission over multiple antennas in case of more than four layer transmission.
Figure 4:
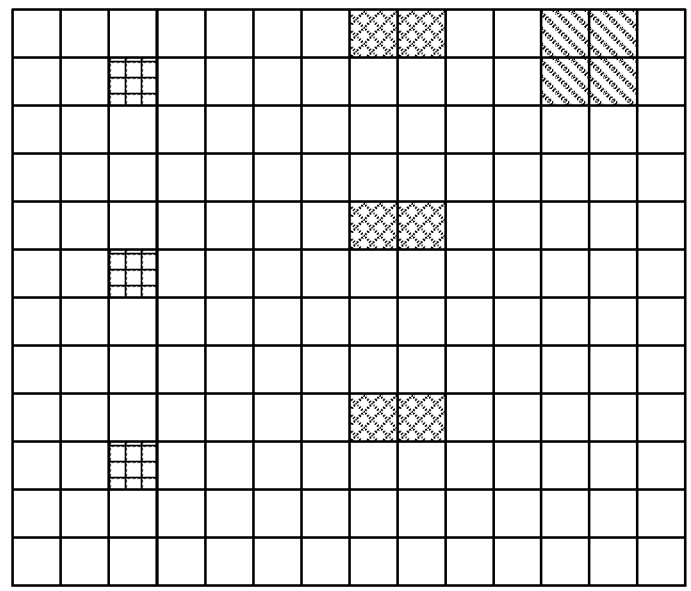
FIG. 4 illustrates an example of a resource element grid.
Figure 4:
Figure 4:
Figure 5:
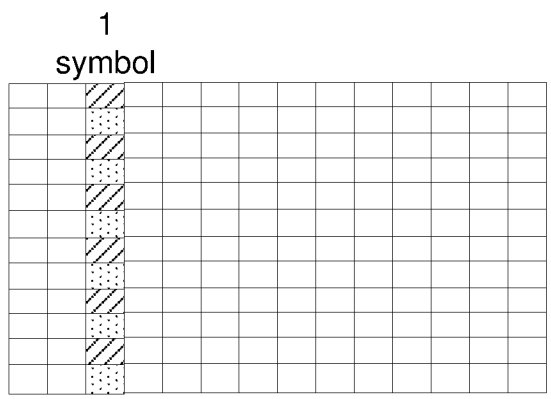
FIG. 5 illustrates an example of front-loaded DM-RS for configuration type 1 and type 2 where different CDM groups indicated by different colors.
Figure 5:
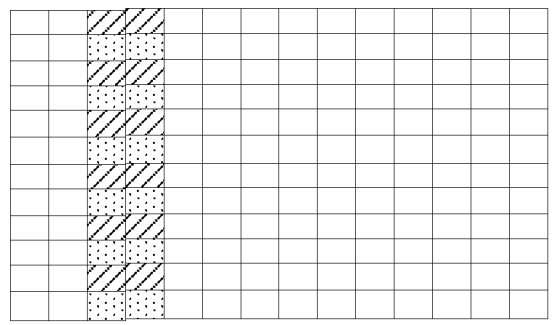
Figure 5:
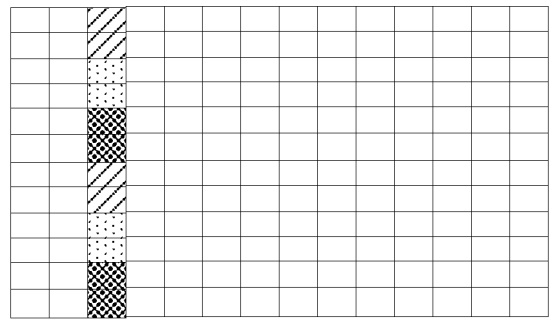
Figure 5:
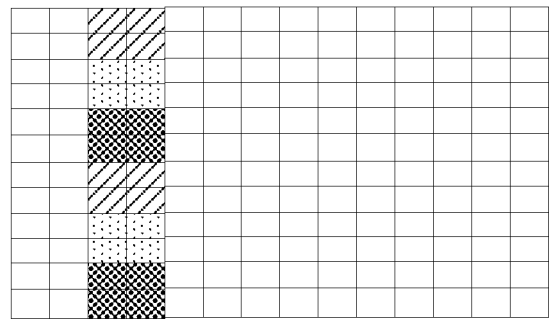
Figure 6:
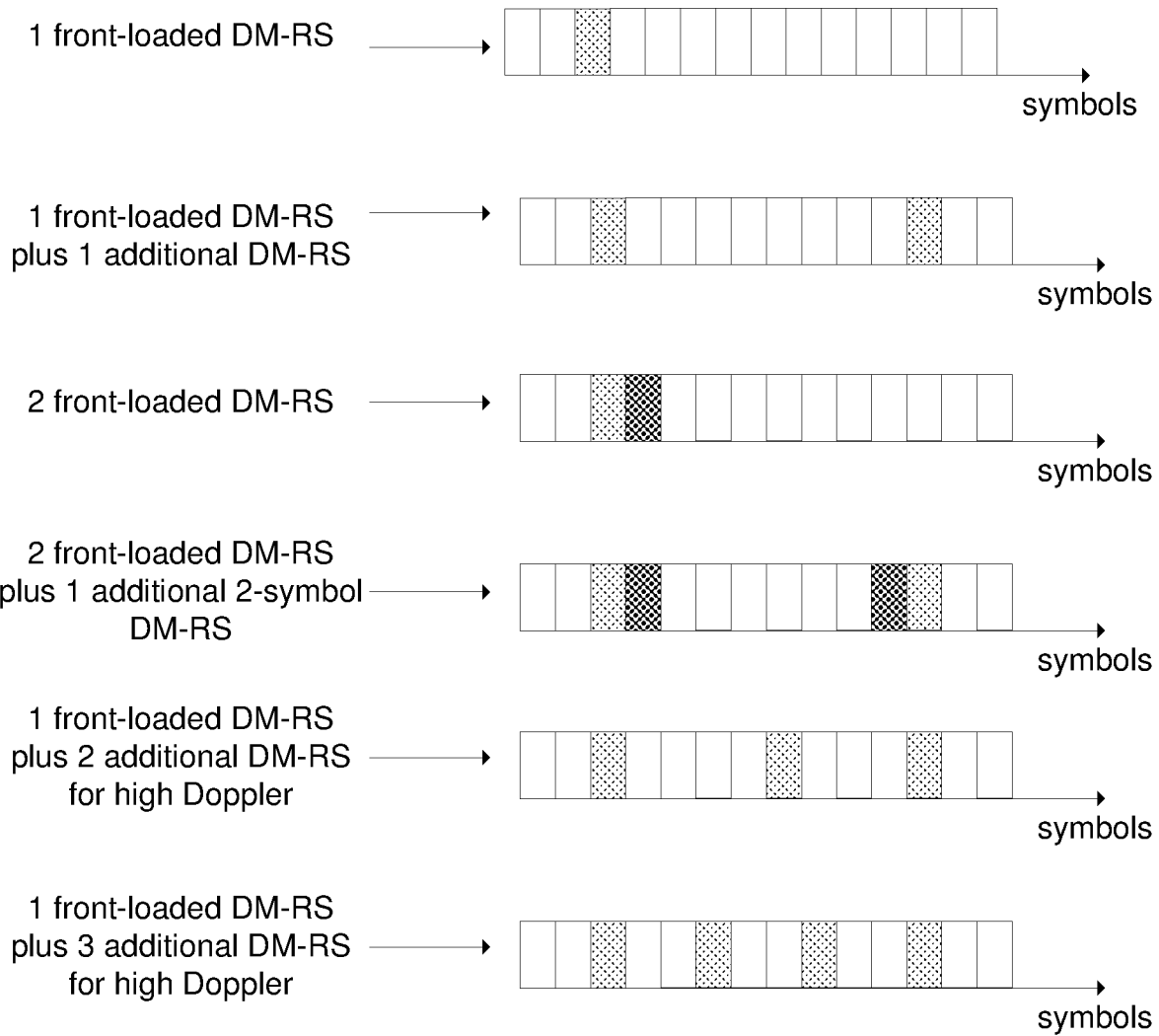
FIG. 6 illustrates examples of DM-RS configurations for PDSCH Mapping Type A.
Figure 7:
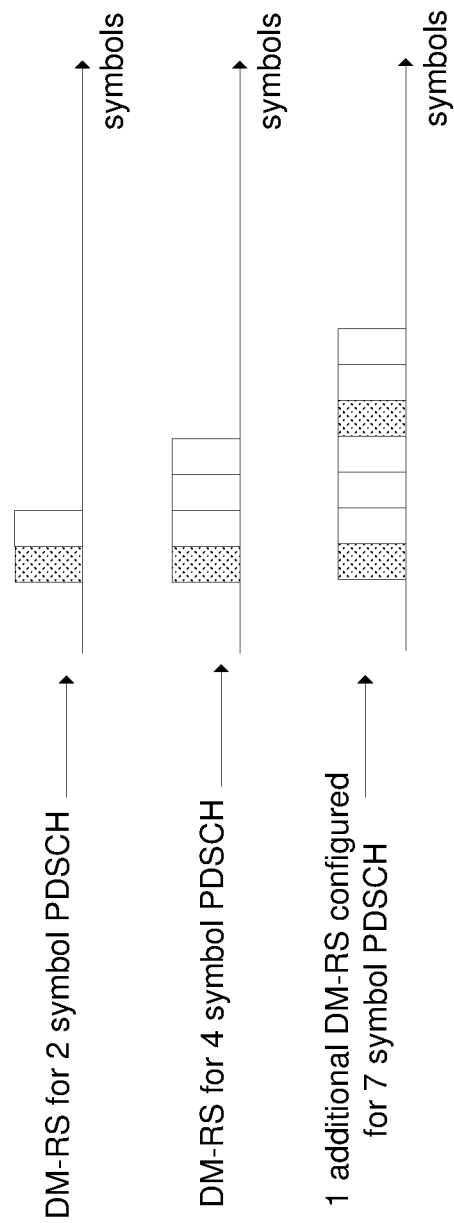
FIG. 7 illustrates examples of DM-RS configurations for PDSCH Mapping Type B.
Figure 8:
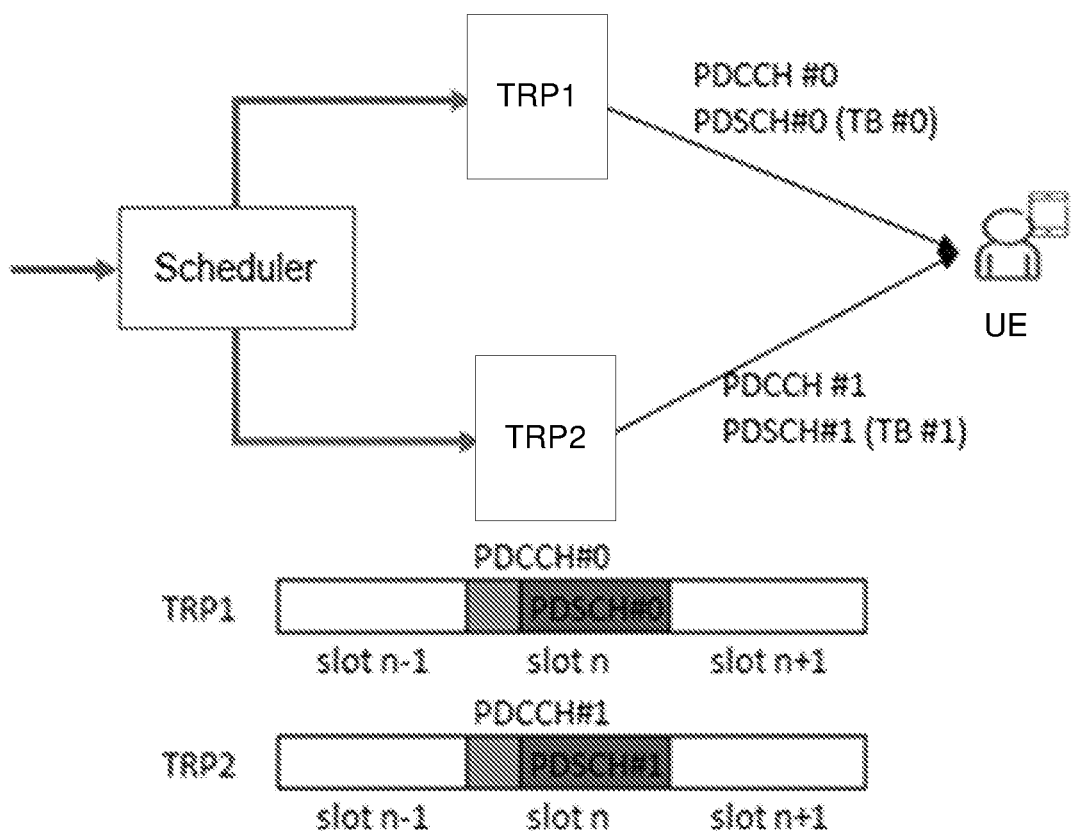
FIG. 8 illustrates an example of NC-JT with a single scheduler.
Figure 9:
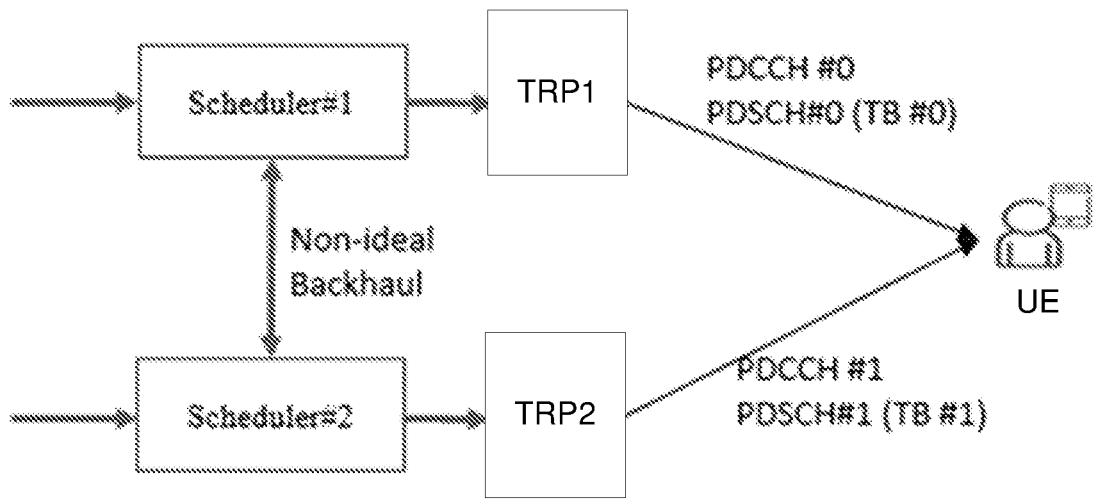
FIG. 9 illustrates an example of NC-JT with independent schedulers.
Figure 10:
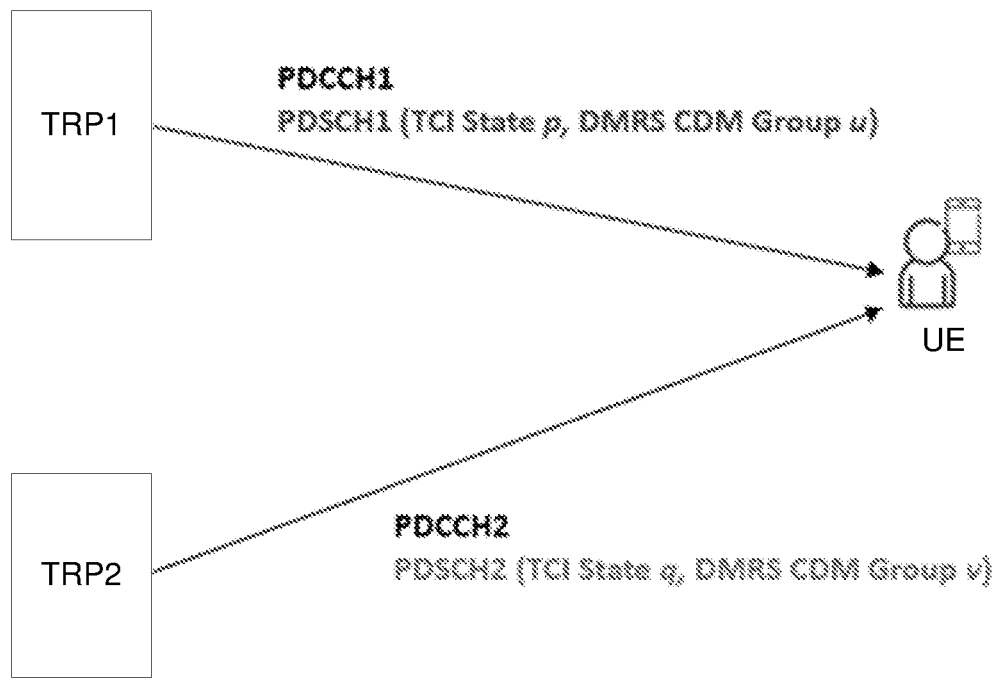
FIG. 10 shows an example illustrating relationship between TCI states and DM-RS CDM groups in a scenario in which UE receives PDSCHs via multiple PDCCHs transmitted from different TRPs.
Figure 11:
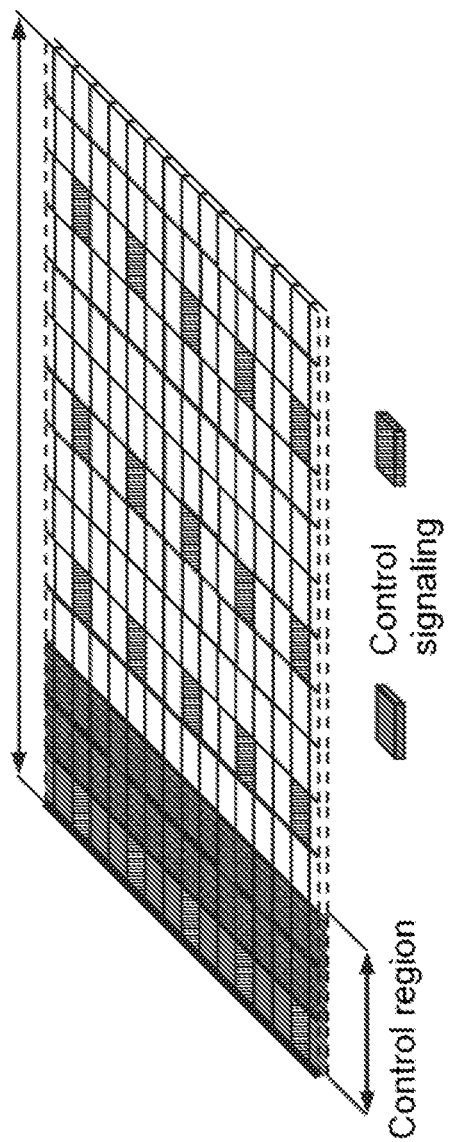
FIG. 11 illustrates example LTE CRS positions.

One problem with existing arrangements is how to operate dynamic spectrum sharing (DSS) between NR and LTE and associated UE configuration of rate matching around LTE CRS, together with the new NR Release 16 feature of non-coherent joint transmission (NC-JT) where PDSCH layers are transmitted from two (or more) TRPs simultaneously, to the same UE.

Some embodiments of the present disclosure provide for multiple sets of LTE CRS patterns configured to the UE. Each set may be associated with a TRP (using NR terminology of TCI states which may be used to identify a TRP). Hence, when NR PDSCH layers are transmitted from a given TRP, the rate matching is performed around the set of LTE CRS patterns that are also transmitted from the same TRP.

Some embodiments of the present disclosure allow for simultaneous use of dynamic spectrum sharing between NR and LTE and NC-JT transmission, which may be an advantage since the NC-JT feature can be used also in networks where DSS is used for e.g., 4th Generation (4G) to 5th Generation (5G) migration.

Before describing in detail exemplary embodiments, it is noted that the embodiments reside primarily in combinations of apparatus components and processing steps related to rate matching for Non-coherent Joint-Transmission (NC-JT) with dynamic spectrum sharing. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission reception point (TRP), transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a user equipment (UE) such as a wireless device (WD) or a radio network node. It is noted that, in some embodiments, the functionality of a TRP discussed herein may be implemented with a network node. Thus, references to TRP herein are understood to include a network node.

In some embodiments, the non-limiting terms wireless device (WD) or a user equipment (UE) are used interchangeably. The UE herein can be any type of wireless device capable of communicating with a network node or another UE over radio signals, such as wireless device (WD). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

The term "mapping" is used herein and may, in some embodiments, indicate a rule that a transmitter and a receiver previously agrees to for determining which resource elements (REs) the transmitter and receiver will arrange one or more physical channels during transmission of the REs. In some embodiments, the TRP and/or network node is the transmitter (transmitting PDCCH and/or PDSCH) and the user equipment is the receiver (receiving the e.g., rate matched PDCCH and/or PDSCH). Thus, in some embodiments, "receiving" may include decoding and/or de-rate matching one or more physical channels according to a predefined mapping (such as the mapping arrangements discussed herein). In some embodiments, "transmitting" may include encoding and/or rate matching one or more physical channels according to the agreed predefined mapping (such as the mapping arrangements discussed herein).

In some embodiments, a "set" is also intended to encompass a single element set as well as multiple element sets. In other words, it is contemplated that in some embodiments, for example, a set of layers includes only 1 layer. In some embodiments, a set of CRS patterns may correspond to a list of CRS patterns.

Even though the descriptions herein may be explained in the context of one of a Downlink (DL) and an Uplink (UL) communication/channel, it should be understood that the basic principles disclosed may also be applicable to the other of the one of the DL and the UL communication. In some embodiments in this disclosure, the principles may be considered applicable to a transmitter and a receiver. For DL communication/channel, the network node is the transmitter and the receiver is the UE. For the UL communication, the transmitter is the UE and the receiver is the network node.

Although the description herein may be explained in the context of PDSCH, it should be understood that the principles may also be applicable to other channels.

Any two or more embodiments described in this disclosure may be combined in any way with each other.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

In some embodiments, control information on one or more resources may be considered to be transmitted in a message having a specific format. A message may comprise or represent bits representing payload information and coding bits, e.g., for error coding.

Receiving (or obtaining) control information may comprise receiving one or more control information messages (e.g., DCI indicating an LTE CRS pattern). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

An indication (e.g., an indication of rate matching PDSCH around an LTE CRS pattern, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction.

Transmitting in downlink may pertain to transmission from the network or network node to the terminal. The terminal may be considered the WD or UE. Transmitting in uplink may pertain to transmission from the terminal/UE to the network or network node. Transmitting in sidelink may pertain to (direct) transmission from one terminal to another. Uplink, downlink and sidelink (e.g., sidelink transmission and reception) may be considered communication directions.

A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or NR and/or LTE standards. A data transmission may represent and/or pertain to transmission of specific data, e.g. a specific block of data and/or transport block.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a user equipment or a network node may be distributed over a plurality of user equipments and/or network nodes. In other words, it is contemplated that the functions of the network node and user equipment described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 12:
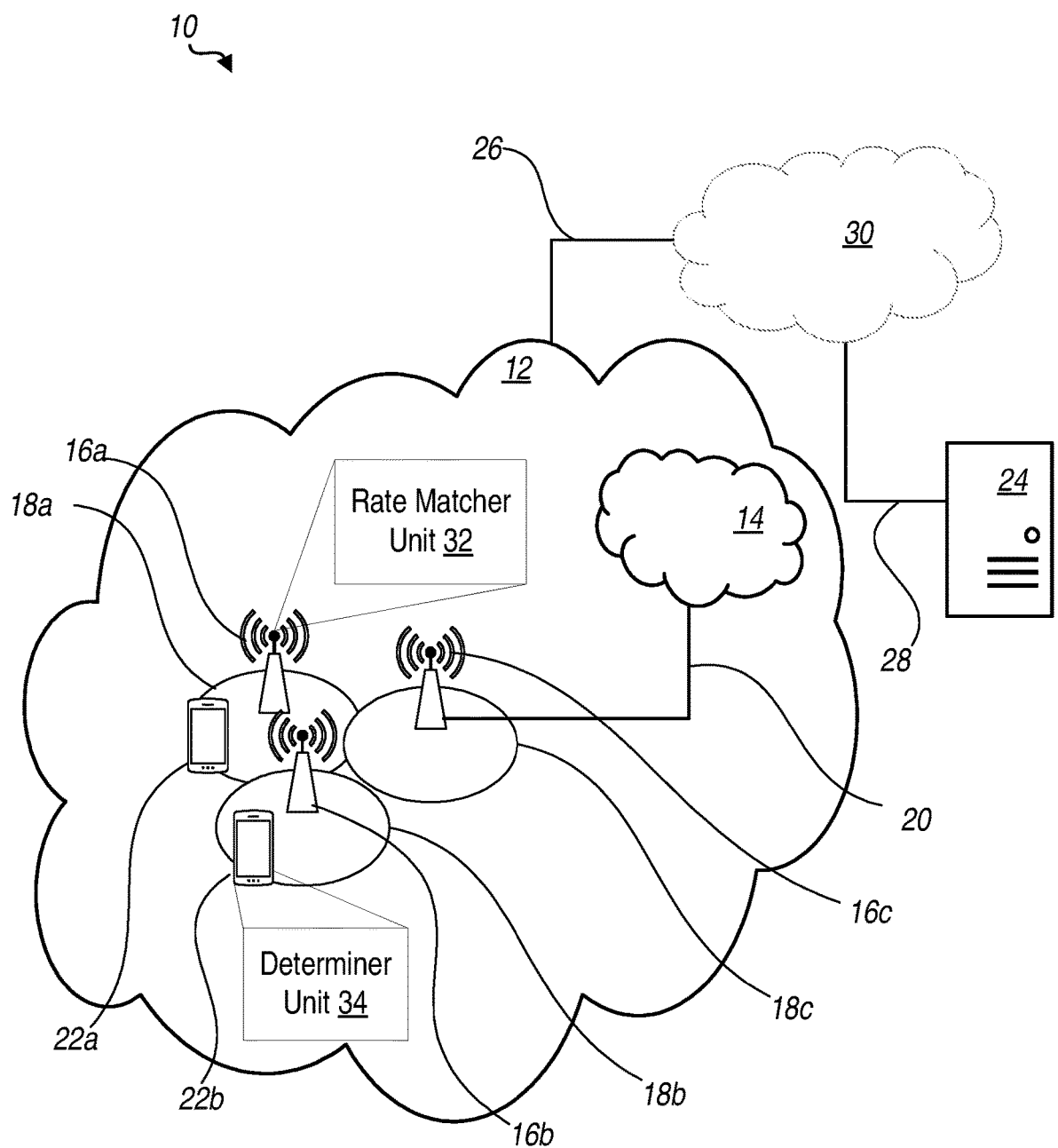
FIG. 12 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 12 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first user equipment (UE) 22a located in coverage area 18a is configured to wirelessly connect to, or be paged by, the corresponding network node 16a. A second UE 22b in coverage area 18b is wirelessly connectable to the corresponding network node 16b. While a plurality of UEs 22a, 22b (collectively referred to as user equipments 22) are illustrated in this example, the disclosed embodiments are equally applicable to a situation where a sole UE is in the coverage area or where a sole UE is connecting to the corresponding network node 16. Note that although only two UEs 22 and three network nodes 16 are shown for convenience, the communication system may include many more UEs 22 and network nodes 16.

Also, it is contemplated that a UE 22 can be in simultaneous communication and/or configured to separately communicate with more than one network node 16 and more than one type of network node 16. For example, a UE 22 can have dual connectivity with a network node 16 that supports LTE and the same or a different network node 16 that supports NR. As an example, UE 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 12 as a whole enables connectivity between one of the connected UEs 22a, 22b and the host computer 24. The connectivity may be described as an over-the-top (OTT) connection. The host computer 24 and the connected UEs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected UE 22a. Similarly, the network node 16 need not be aware of the future routing of an outgoing uplink communication originating from the UE 22a towards the host computer 24.

A network node 16 is configured to include a rate matcher unit 32 which is configured to control/instruct a UE 22 according to and/or implement the rate matching techniques disclosed herein. In some embodiments, network node 16 includes rate matcher unit 32 which is configured to cause the network node 16 to transmit at least one physical downlink shared channel, PDSCH, of at least two physical downlink shared channels, PDSCHs; a first PDSCH of the at least two PDSCHs being associated with a first set of cell-specific reference signal, CRS, patterns and a second PDSCH of the at least two PDSCHs being associated with a second set of CRS patterns; and the at least two PDSCHs being rate matched around at least one of the first set of CRS patterns and the second set of CRS patterns.

A user equipment 22 is configured to include a determiner unit 34 which is configured to receive and determine control/instructions from a network node 16 and/or receive and/or decode PDSCH according to the rate matching mapping techniques disclosed herein. In some embodiments, user equipment 22 includes determiner unit 34 which is configured to cause the user equipment 22 to receive at least two physical downlink shared channels, PDSCHs; a first PDSCH of the at least two PDSCHs being associated with a first set of cell-specific reference signal, CRS, patterns and a second PDSCH of the at least two PDSCHs being associated with a second set of CRS patterns; and the at least two PDSCHs being rate matched around at least one of the first set of CRS patterns and the second set of CRS patterns.

Example implementations, in accordance with an embodiment, of the UE 22, network node 16 and host computer 24 discussed in the preceding paragraphs will now be described with reference to FIG. 13. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a UE 22 connecting via an OTT connection 52 terminating at the UE 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the user equipment 22. The processing circuitry 42 of the host computer 24 may include a monitor unit 54 configured to enable the service provider to observe, monitor, control, transmit to and/or receive from the network node 16 and/or the user equipment 22.

The communication system 10 further includes a network node 16 provided in a communication system 10 and including hardware 58 enabling it to communicate with the host computer 24 and with the UE 22. The hardware 58 may include a communication interface 60 for setting up and maintaining a wired or wireless connection with an interface of a different communication device of the communication system 10, as well as a radio interface 62 for setting up and maintaining at least a wireless connection 64 with a UE 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include rate matcher unit 32 configured to perform the network node techniques disclosed herein, such as, the techniques discussed with reference to FIGS. 18 and 19, as well as the other figures.

The communication system 10 further includes the UE 22 already referred to. The UE 22 may have hardware 80 that may include a radio interface 82 configured to set up and maintain a wireless connection 64 with a network node 16 serving a coverage area 18 in which the UE 22 is currently located. The radio interface 82 may be formed as or may include, for example, one or more RF transmitters, one or more RF receivers, and/or one or more RF transceivers.

The hardware 80 of the UE 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 90, which is stored in, for example, memory 88 at the UE 22, or stored in external memory (e.g., database, storage array, network storage device, etc.) accessible by the UE 22. The software 90 may be executable by the processing circuitry 84. The software 90 may include a client application 92. The client application 92 may be operable to provide a service to a human or non-human user via the UE 22, with the support of the host computer 24. In the host computer 24, an executing host application 50 may communicate with the executing client application 92 via the OTT connection 52 terminating at the UE 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by UE 22. The processor 86 corresponds to one or more processors 86 for performing UE 22 functions described herein. The UE 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to UE 22. For example, the processing circuitry 84 of the user equipment 22 may include a determiner unit 34 configured to perform the UE techniques disclosed herein, such as, the techniques discussed with reference to FIGS. 20 and 21, as well as the other figures.

Figure 13:
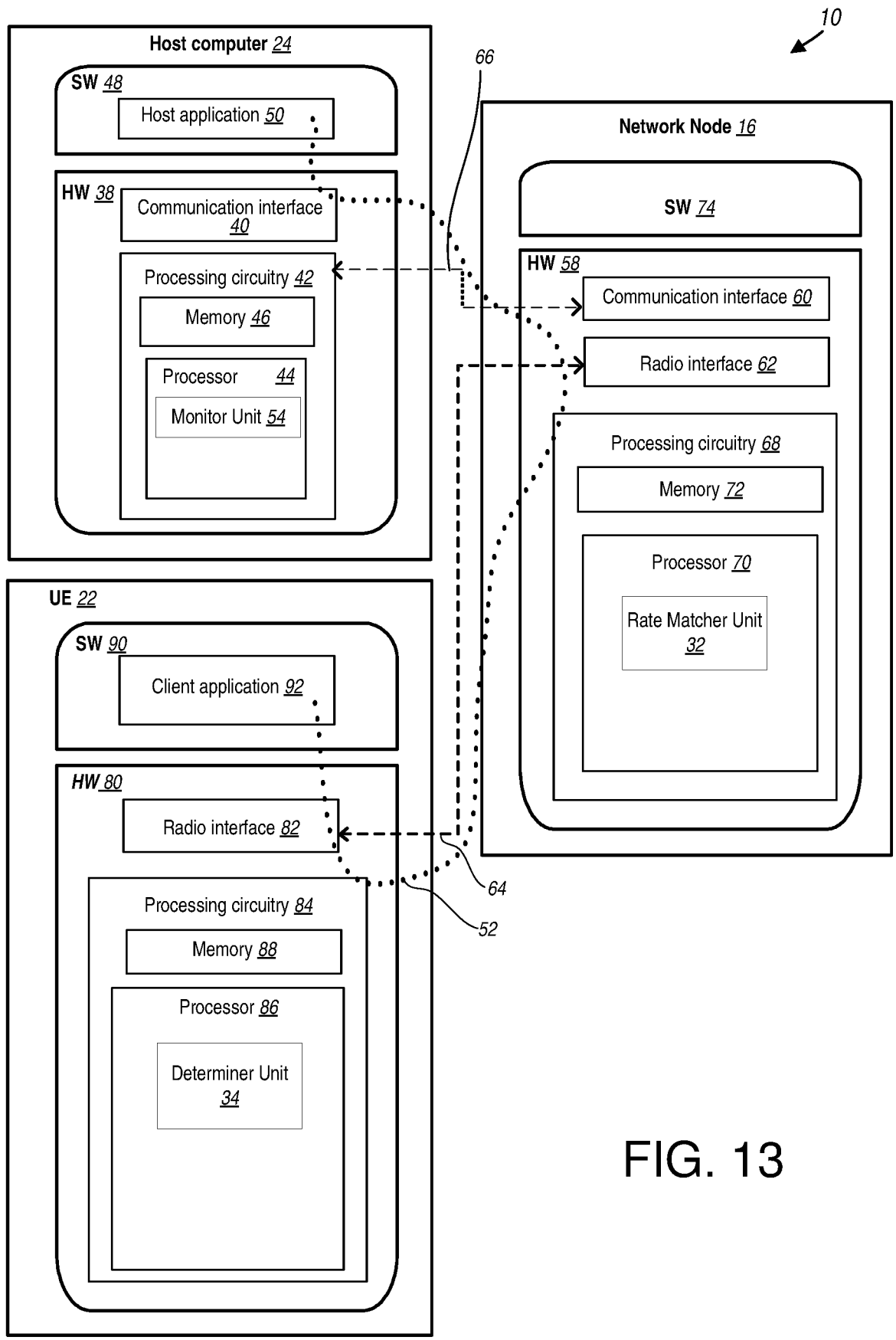
FIG. 13 is a block diagram of a host computer communicating via a network node with a user equipment over an at least partially wireless connection according to some embodiments of the present disclosure.

In some embodiments, the inner workings of the network node 16, UE 22, and host computer 24 may be as shown in FIG. 13 and independently, the surrounding network topology may be that of FIG. 12.

In FIG. 13, the OTT connection 52 has been drawn abstractly to illustrate the communication between the host computer 24 and the user equipment 22 via the network node 16, without explicit reference to any intermediary devices and the precise routing of messages via these devices. Network infrastructure may determine the routing, which it may be configured to hide from the UE 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the UE 22 and the network node 16 is in accordance with the teachings of the embodiments described throughout this disclosure. One or more of the various embodiments improve the performance of OTT services provided to the UE 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and UE 22, in response to variations in the measurement results. The measurement procedure and/or the network functionality for reconfiguring the OTT connection 52 may be implemented in the software 48 of the host computer 24 or in the software 90 of the UE 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary UE signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the UE 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the UE 22, and/or preparing/terminating/maintaining/supporting/ending in receipt of a transmission from the UE 22.

In some embodiments, the host computer 24 includes processing circuitry 42 and a communication interface 40 that is configured to a communication interface 40 configured to receive user data originating from a transmission from a UE 22 to a network node 16. In some embodiments, the UE 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 12 and 13 show various "units" such as rate matcher unit 32, and determiner unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 14:
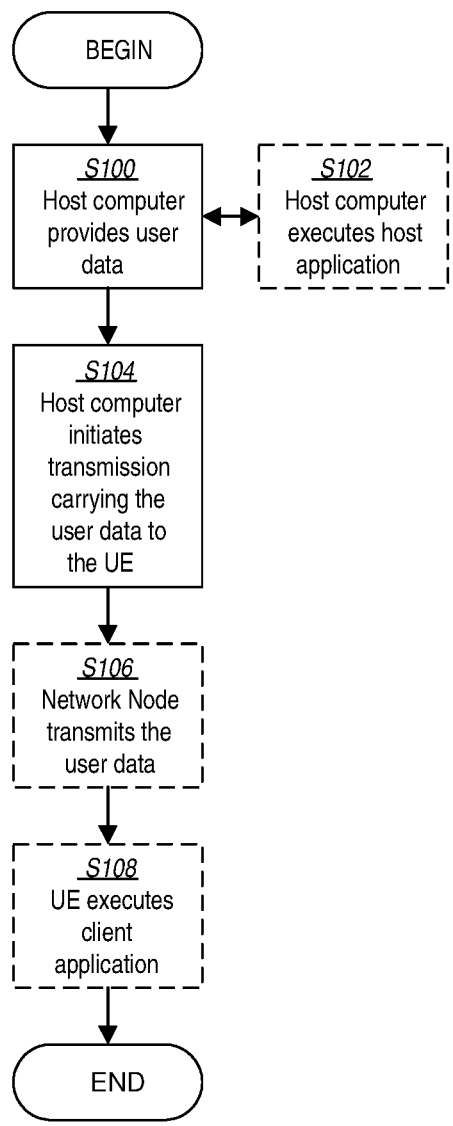
FIG. 14 is a flowchart illustrating exemplary methods implemented in a communication system including a host computer, a network node and a user equipment for executing a client application at a user equipment according to some embodiments of the present disclosure.

FIG. 14 is a flowchart illustrating an exemplary method implemented in a communication system, such as, for example, the communication system of FIGS. 12 and 13, in accordance with one embodiment. The communication system may include a host computer 24, a network node 16 and a UE 22, which may be those described with reference to FIG. 13. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the UE 22 (Block S104). In an optional third step, the network node 16 transmits to the UE 22 the user data which was carried in the transmission that the host computer 24 initiated, in accordance with the teachings of the embodiments described throughout this disclosure (Block S106). In an optional fourth step, the UE 22 executes a client application, such as, for example, the client application 92, associated with the host application 50 executed by the host computer 24 (Block S108).

Figure 15:
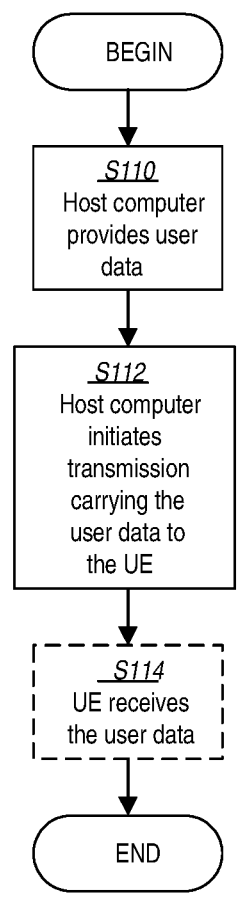
FIG. 15 is a flowchart illustrating exemplary methods implemented in a communication system including a host computer, a network node and a user equipment for receiving user data at a user equipment according to some embodiments of the present disclosure.

FIG. 15 is a flowchart illustrating an exemplary method implemented in a communication system, such as, for example, the communication system of FIG. 12, in accordance with one embodiment. The communication system may include a host computer 24, a network node 16 and a UE 22, which may be those described with reference to FIGS. 12 and 13. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the UE 22 (Block S112). The transmission may pass via the network node 16, in accordance with the teachings of the embodiments described throughout this disclosure. In an optional third step, the UE 22 receives the user data carried in the transmission (Block S114).

Figure 16:
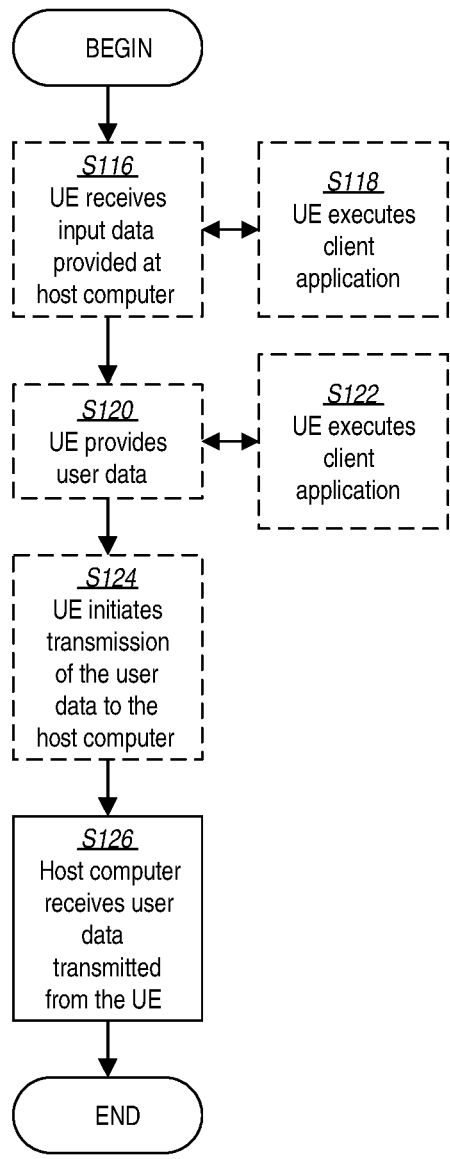
FIG. 16 is a flowchart illustrating exemplary methods implemented in a communication system including a host computer, a network node and a user equipment for receiving user data from the user equipment at a host computer according to some embodiments of the present disclosure.

FIG. 16 is a flowchart illustrating an exemplary method implemented in a communication system, such as, for example, the communication system of FIG. 12, in accordance with one embodiment. The communication system may include a host computer 24, a network node 16 and a UE 22, which may be those described with reference to FIGS. 12 and 13. In an optional first step of the method, the UE 22 receives input data provided by the host computer 24 (Block S116). In an optional substep of the first step, the UE 22 executes the client application 92, which provides the user data in reaction to the received input data provided by the host computer 24 (Block S118). Additionally or alternatively, in an optional second step, the UE 22 provides user data (Block S120). In an optional substep of the second step, the UE provides the user data by executing a client application, such as, for example, client application 92 (Block S122). In providing the user data, the executed client application 92 may further consider user input received from the user. Regardless of the specific manner in which the user data was provided, the UE 22 may initiate, in an optional third substep, transmission of the user data to the host computer 24 (Block S124). In a fourth step of the method, the host computer 24 receives the user data transmitted from the UE 22, in accordance with the teachings of the embodiments described throughout this disclosure (Block S126).

Figure 17:
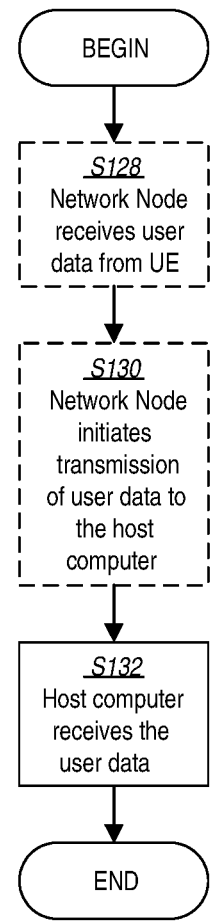
FIG. 17 is a flowchart illustrating exemplary methods implemented in a communication system including a host computer, a network node and a user equipment for receiving user data at a host computer according to some embodiments of the present disclosure.

FIG. 17 is a flowchart illustrating an exemplary method implemented in a communication system, such as, for example, the communication system of FIG. 12, in accordance with one embodiment. The communication system may include a host computer 24, a network node 16 and a UE 22, which may be those described with reference to FIGS. 12 and 13. In an optional first step of the method, in accordance with the teachings of the embodiments described throughout this disclosure, the network node 16 receives user data from the UE 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 18:
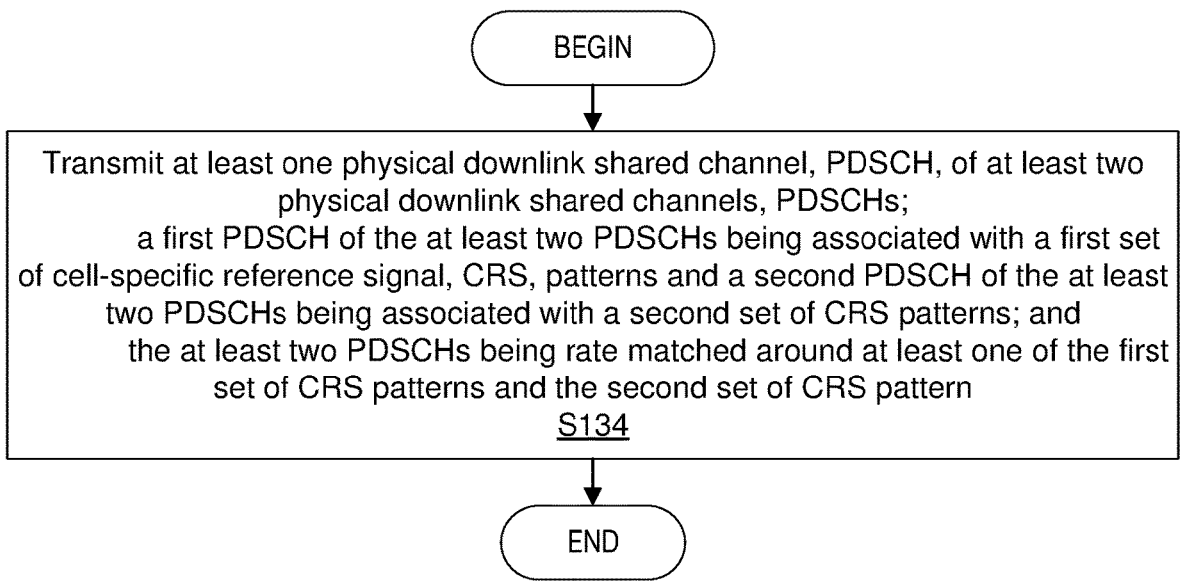
FIG. 18 is a flowchart of an exemplary process in a network node for rate matcher according to some embodiments of the present disclosure.

It is noted that, in the embodiments described with reference to FIGS. 18-22, transmission point (TRP) can be understood as network node. FIG. 18 is a flowchart of an exemplary process in a network node 16 for performing rate matching techniques according to some embodiments of the present disclosure. One or more Blocks and/or functions and/or methods performed by the network node 16 may be performed by one or more elements of network node 16 such as by rate matcher unit 32 in processing circuitry 68, processor 70, communication interface 60, radio interface 62, etc. according to the example method. The example method includes transmitting (Block S134), such as via rate matcher unit 32, processing circuitry 68, processor 70, communication interface 60 and/or radio interface 62, at least one physical downlink shared channel, PDSCH, of at least two physical downlink shared channels, PDSCHs; a first PDSCH of the at least two PDSCHs being associated with a first set of cell-specific reference signal, CRS, patterns and a second PDSCH of the at least two PDSCHs being associated with a second set of CRS patterns; and the at least two PDSCHs being rate matched around at least one of the first set of CRS patterns and the second set of CRS patterns.

In some embodiments, the first PDSCH is rate matched, such as via rate matcher unit 32, processing circuitry 68, processor 70, communication interface 60 and/or radio interface 62, around resource elements associated with the first set of CRS patterns, and the second PDSCH is rate matched around resource elements associated with the second set of CRS patterns. In some embodiments, the first PDSCH is rate matched, such as via rate matcher unit 32, processing circuitry 68, processor 70, communication interface 60 and/or radio interface 62, around resource elements associated with the first and second sets of CRS patterns, and the second PDSCH is rate matched around resource elements associated with the first and second sets of CRS patterns. In some embodiments, the at least two PDSCHs are associated with a first radio access technology, RAT, and the first and second sets of CRS patterns are associated with a second radio access technology, RAT. In some embodiments, the first RAT is New Radio, NR, and the second RAT is Long Term Evolution, LTE.

In some embodiments, the at least two PDSCHs are transmitted, such as via rate matcher unit 32, processing circuitry 68, processor 70, communication interface 60 and/or radio interface 62, in a same slot. In some embodiments, the first PDSCH is transmitted by the network node and the second PDSCH is transmitted by a second network node, the second network node being different from the network node. In some embodiments, the first PDSCH and the first set of CRS patterns are associated with at least one of a first transmission configuration indicator, TCI, state and a first code division multiplexing, CDM, group; and the second PDSCH and the second set of CRS patterns are associated with at least one of a second transmission configuration indicator, TCI, state and a second code division multiplexing, CDM, group.

In some embodiments, the method further includes transmitting, such as via rate matcher unit 32, processing circuitry 68, processor 70, communication interface 60 and/or radio interface 62, a configuration indicating the first and second sets of CRS patterns; and transmitting a downlink control information, DCI, scheduling at least one the first and second PDSCHs, the DCI indicating the at least one of the first and second sets of CRS patterns in the configuration that the scheduled at least one the first and second PDSCHs are to be rate matched around. In some embodiments of this aspect, the first and second PDSCHs are scheduled by a first and a second DCIs, respectively. In some embodiments of this aspect, the first and the second DCIs are received in a first and a second Control resource Sets, CORESETs, respectively. In some embodiments of this aspect, the first and the second CORESETs are associated with the first and the second sets of CRS patterns, respectively. In some embodiments, the first and second PDSCHs are scheduled by a same DCI.

In some embodiments, the method is for transmitting one or more physical downlink shared channels (PDSCHs) comprising a first set of layers and a second set of layers in which a DMRS of a first code division multiplexing (CDM) group is associated with the first set of layers and a DMRS of a second CDM group is associated with the second set of layers. The method includes transmitting and/or rate matching, such as via rate matcher unit 32, processing circuitry 68, processor 70 and/or radio interface 62, the one or more PDSCHs according to a PDSCH resource mapping, the PDSCH resource mapping based at least in part on a first cell-specific reference signal (CRS) pattern and/or a second CRS pattern, the first CRS pattern and the second CRS pattern being associated with the first set of layers and the second set of layers, respectively.

In some embodiments, the PDSCH resource mapping is a PDSCH-to-resource element (RE) per layer. In some embodiments, the one or more PDSCHs are New Radio (NR) PDSCHs and the CRS patterns are Long Term Evolution (LTE) CRS patterns.

In some embodiments, the mapping indicates that the first set of layers associated to the first CDM group are not mapped to CRS RE(s) associated with the first CDM group and that the second set of layers associated to the second CDM group are not mapped to CRS RE(s) associated with the second CDM group. In some embodiments, the mapping indicates that the first set of layers associated to the first CDM group are mapped to CRS RE(s) associated with the second CDM group and that the second set of layers associated to the second CDM group are mapped to CRS RE(s) associated with the first CDM group. In some embodiments, the mapping indicates that the first set of layers of the first CDM group are not mapped to CRS RE(s) associated with the first and second CDM group and that the second set of layers of the second CDM group are not mapped to CRS RE(s) associated with the first and second CDM group.

In some embodiments, the association between the first and second set of layers and the respective first and second set of CRS patterns are obtained by indication using a transmission configuration indication (TCI) state or a TCI code point. In some embodiments, the first set of layers belongs to a first PDSCH and the second set of layers belong to a second PDSCH. In some embodiments, each PDSCH is scheduled (e.g., by network node 16 scheduler) by a physical downlink control channel (PDCCH) including a TCI state that is associated with a set of CRS patterns.

Figure 19:
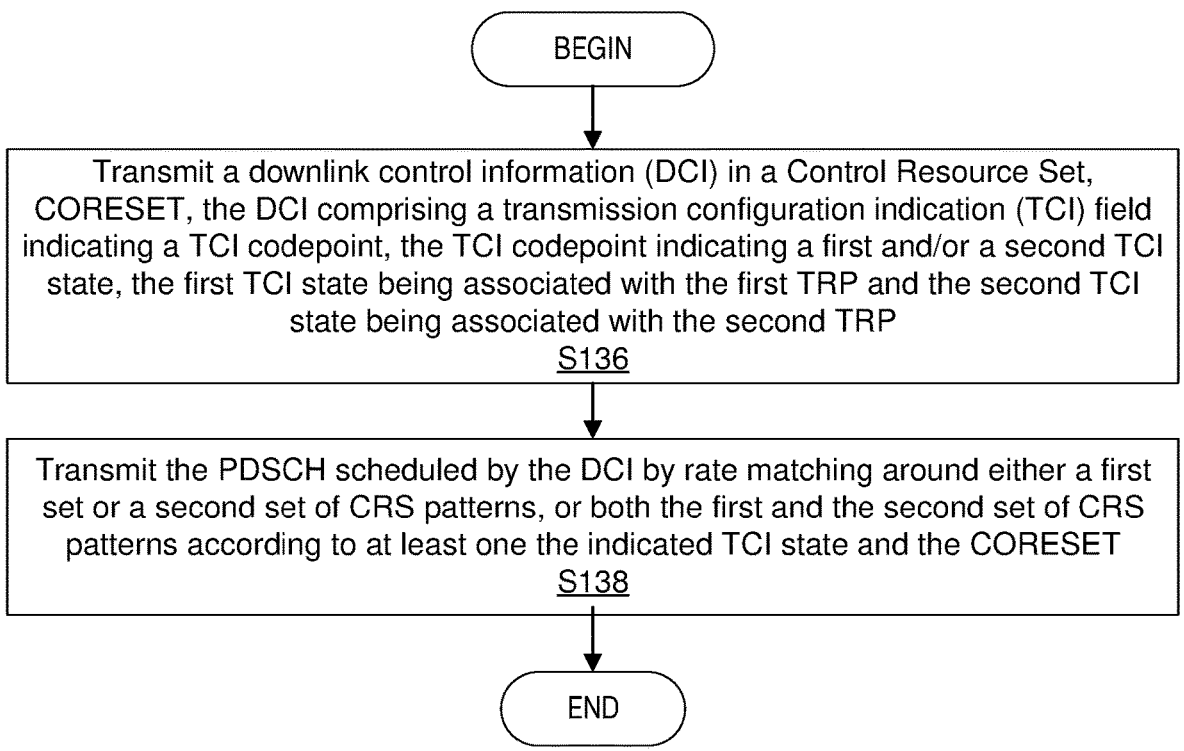
FIG. 19 is a flowchart of yet another exemplary process in a network node for rate matcher according to some embodiments of the present disclosure.

FIG. 19 is a flowchart of another exemplary process in a network node 16 for performing rate matching techniques according to some embodiments of the present disclosure. One or more Blocks and/or functions and/or methods performed by the network node 16 may be performed by one or more elements of network node 16 such as by rate matcher unit 32 in processing circuitry 68, processor 70, communication interface 60, radio interface 62, etc. according to the example method. In some embodiments, the method is for transmitting a physical downlink shared channel (PDSCH) over a first transmission point (TRP), such as a network node 16, or a second TRP, such as another network node 16, the first and second TRPs further being respectively associated with a first and second set of CRS patterns.

The method may include transmitting (Block S136), such as via rate matcher unit 32, processing circuitry 68, processor 70, communication interface 60 and/or radio interface 62, a downlink control information (DCI) in a Control Resource Set, CORESET, the DCI comprising a transmission configuration indication (TCI) field indicating a TCI codepoint, the TCI codepoint indicating a first and/or a second TCI state, the first TCI state being associated with the first TRP and the second TCI state being associated with the second TRP. The method may include transmitting (Block S138), such as via rate matcher unit 32, processing circuitry 68, processor 70, communication interface 60 and/or radio interface 62, the PDSCH scheduled by the DCI by rate matching around either a first set or a second set of CRS patterns, or both the first and the second set of CRS patterns according to at least one the indicated TCI state and the CORESET.

In some embodiments, the method includes transmitting, such as via rate matcher unit 32, processing circuitry 68, processor 70 and/or radio interface 62, a downlink control information (DCI) in a first or a second Control Resource Set, CORESET, the first and second CORESETs being respectively associated with the first and the second set of CRS patterns. The DCI schedules the PDSCH and comprises a transmission configuration indication (TCI) field indicating a TCI codepoint, the TCI codepoint indicating a first and/or a second TCI state, the first TCI state being associated with the first TRP and the second TCI state being associated with the second TRP. The method includes transmitting, such as via rate matcher unit 32, processing circuitry 68, processor 70 and/or radio interface 62, the PDSCH by rate matching around either only the first set of CRS patterns, the second set of CRS patterns, or both the first set of CRS patterns and the second set of CRS patterns according to at least one of the indicated first or the second TCI state and the first or the second CORESET.

In some embodiments, the PDSCH is a New Radio (NR) PDSCH and the CRS patterns are Long Term Evolution (LTE) CRS patterns. In some embodiments, the first TCI state is associated with a third set of CRS patterns and the second TCI state is associated with a fourth set of CRS patterns. In some embodiments, the first set of CRS patterns are a subset of the third set of CRS patterns and that the second set of CRS patterns is not a subset of the third set of CRS patterns. In some embodiments, both the first set of CRS patterns are a subset of the third set of CRS patterns and the second set of CRS patterns are a subset of the third set of CRS patterns. In some embodiments, the association between a TCI state and a respective TRP is determined by a quasi co-location (QCL) relation. In some embodiments, the first set of CRS patterns comprises a CRS pattern that at least partially overlaps in bandwidth with at least one CRS pattern comprised in the second set of CRS patterns.

Figure 20:
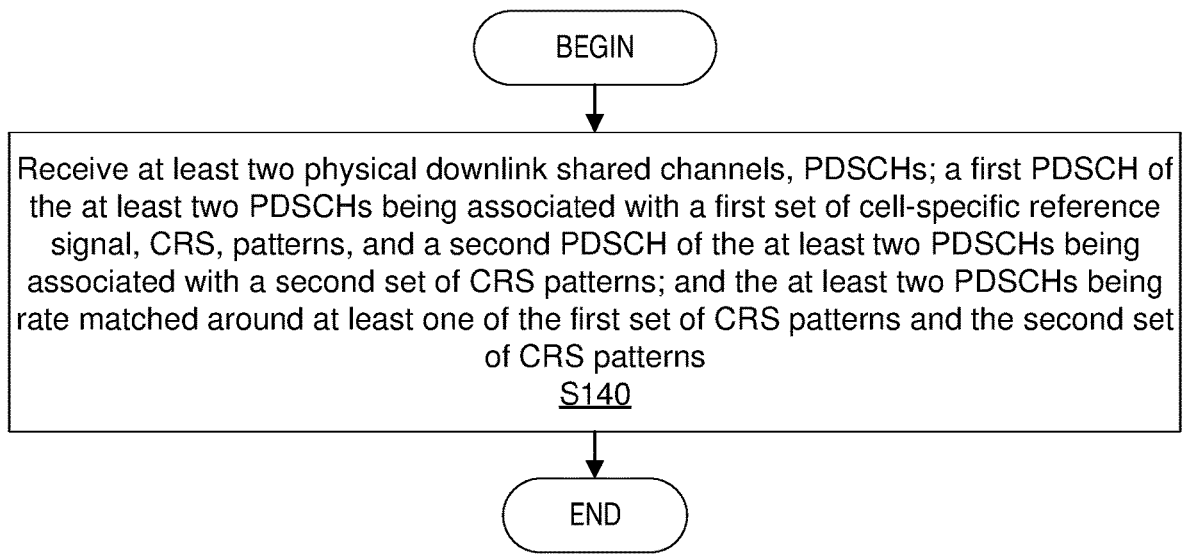
FIG. 20 is a flowchart of an exemplary process in a user equipment for determiner according to some embodiments of the present disclosure.

FIG. 20 is a flowchart of an exemplary process in a user equipment 22 for performing rate matching techniques according to some embodiments of the present disclosure. One or more Blocks and/or functions and/or methods performed by UE 22 may be performed by one or more elements of UE 22 such as by determiner unit 34 in processing circuitry 84, processor 86, radio interface 82, etc. The example method includes receiving (Block S140), such as via determiner unit 34, processing circuitry 84, processor 86 and/or radio interface 82, at least two physical downlink shared channels, PDSCHs; a first PDSCH of the at least two PDSCHs being associated with a first set of cell-specific reference signal, CRS, patterns, and a second PDSCH of the at least two PDSCHs being associated with a second set of CRS patterns; and the at least two PDSCHs being rate matched around at least one of the first set of CRS patterns and the second set of CRS patterns.

In some embodiments, the UE 22 is configured to, such as via determiner unit 34, processing circuitry 84, processor 86 and/or radio interface 82, receive the one or more PDSCHs according to a PDSCH resource mapping, the PDSCH resource mapping based at least in part on a first set of cell-specific reference signal (CRS) patterns and/or a second set of CRS patterns, the first set of CRS patterns and the second set of CRS patterns being associated with the first set of layers and the second set of layers, respectively.

In some embodiments, the first PDSCH is rate matched around resource elements associated with the first set of CRS patterns, and the second PDSCH is rate matched around resource elements associated with the second set of CRS patterns. In some embodiments, the first PDSCH is rate matched around resource elements associated with the first and second sets of CRS patterns, and the second PDSCH is rate matched around resource elements associated with the first and second sets of CRS patterns. In some embodiments, the at least two PDSCHs are associated with a first radio access technology, RAT, and the first and second sets of CRS patterns are associated with a second radio access technology, RAT. In some embodiments, the first RAT is New Radio, NR, and the second RAT is Long Term Evolution, LTE.

In some embodiments, the at least two PDSCHs are received, such as via determiner unit 34, processing circuitry 84, processor 86 and/or radio interface 82, in a same slot. In some embodiments, the first PDSCH is transmitted by a first network node and the second PDSCH is transmitted by a second network node, the second network node being different from the first network node. In some embodiments, the first PDSCH and the first set of CRS patterns are associated with at least one of a first transmission configuration indicator, TCI, state and a first code division multiplexing, CDM, group; and the second PDSCH and the second set of CRS patterns are associated with at least one of a second transmission configuration indicator, TCI, state and a second code division multiplexing, CDM, group.

In some embodiments, the method further includes receiving, such as via determiner unit 34, processing circuitry 84, processor 86 and/or radio interface 82, a configuration indicating the first and second sets of CRS patterns; and receiving, such as via determiner unit 34, processing circuitry 84, processor 86 and/or radio interface 82, a downlink control information, DCI, scheduling at least one of the first and second PDSCHs, the DCI indicating the at least one of the first and second sets of CRS patterns in the configuration that the scheduled at least one the first and second PDSCHs are to be rate matched around. In some embodiments of this aspect, the first and second PDSCHs are scheduled by a first and a second DCIs, respectively. In some embodiments of this aspect, the first and the second DCIs are received in a first and a second Control resource Sets, CORESETs, respectively. In some embodiments of this aspect, the first and the second CORESETs are associated with the first and the second sets of CRS patterns, respectively. In some embodiments, the first and second PDSCHs are scheduled by a same DCI.

In some embodiments, the method is for receiving one or more physical downlink shared channels (PDSCHs) comprising a first set of layers and a second set of layers in which a DMRS of a first code division multiplexing (CDM) group is associated with the first set of layers and a DMRS of a second CDM group is associated with the second set of layers. The method includes receiving and/or decoding and/or de-rate matching, such as via determiner unit 34, processing circuitry 84, processor 86, radio interface 82, the one or more PDSCHs according to a PDSCH resource mapping, the PDSCH resource mapping based at least in part on a first cell-specific reference signal (CRS) pattern and/or a second CRS pattern, the first CRS pattern and the second CRS pattern being associated with the first set of layers and the second set of layers, respectively.

In some embodiments, the PDSCH resource mapping is a PDSCH-to-resource element (RE) per layer. In some embodiments, the one or more PDSCHs are New Radio (NR) PDSCHs and the CRS patterns are Long Term Evolution (LTE) CRS patterns.

In some embodiments, the mapping indicates that the first set of layers associated to the first CDM group are not mapped to CRS RE(s) associated with the first CDM group and that the second set of layers associated to the second CDM group are not mapped to CRS RE(s) associated with the second CDM group. In some embodiments, the mapping indicates that the first set of layers associated to the first CDM group are mapped to CRS RE(s) associated with the second CDM group and that the second set of layers associated to the second CDM group are mapped to CRS RE(s) associated with the first CDM group. In some embodiments, the mapping indicates that the first set of layers of the first CDM group are not mapped to CRS RE(s) associated with the first and second CDM group and that the second set of layers of the second CDM group are not mapped to CRS RE(s) associated with the first and second CDM group.

In some embodiments, the association between the first and second set of layers and the respective first and second set of CRS patterns are obtained by indication using a transmission configuration indication (TCI) state or a TCI code point. In some embodiments, the first set of layers belongs to a first PDSCH and the second set of layers belong to a second PDSCH. In some embodiments, each PDSCH is scheduled (e.g., by network node 16 scheduler) by a physical downlink control channel (PDCCH) including a TCI state that is associated with a set of CRS patterns.

Figure 21:
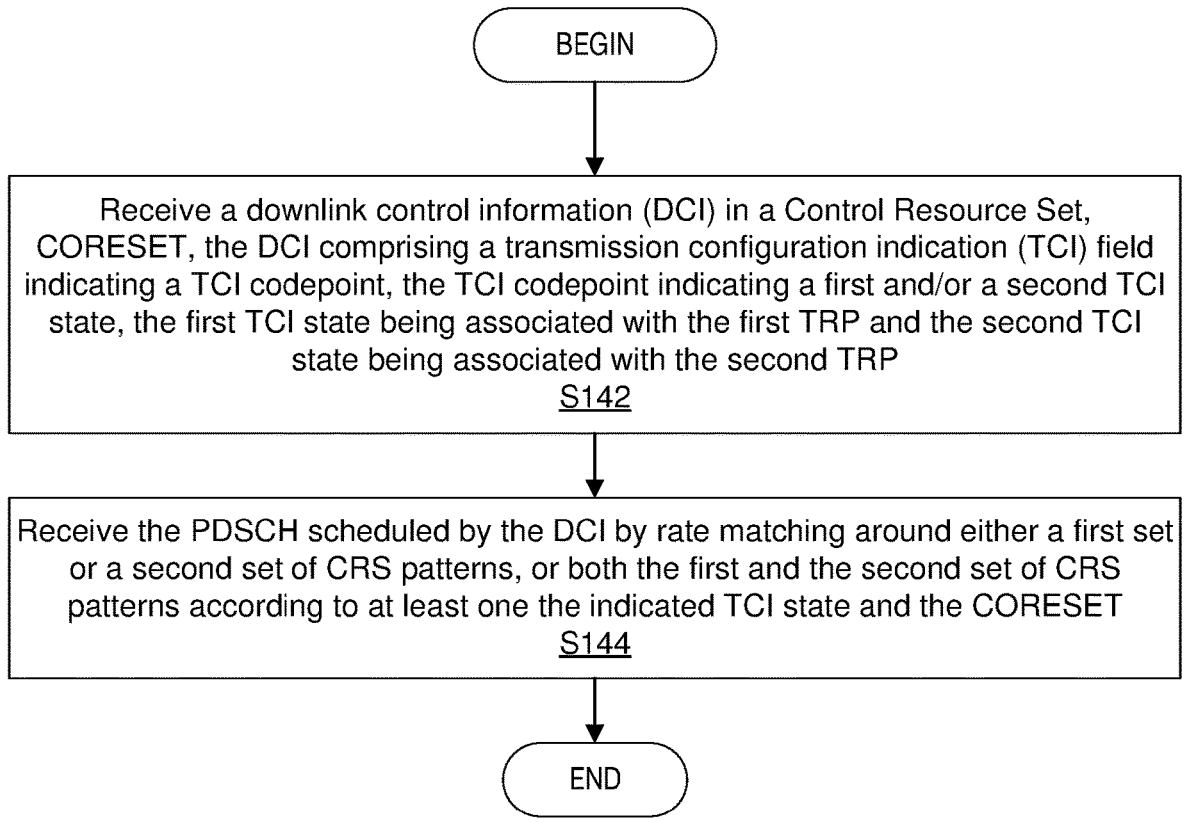
FIG. 21 is a flowchart of yet another exemplary process in a user equipment for determiner according to some embodiments of the present disclosure.

FIG. 21 is a flowchart of an exemplary process in a user equipment 22 for performing rate matching techniques according to some embodiments of the present disclosure. One or more Blocks and/or functions and/or methods performed by UE 22 may be performed by one or more elements of UE 22 such as by determiner unit 34 in processing circuitry 84, processor 86, radio interface 82, etc. The method may include receiving (Block S142), such as via determiner unit 34 in processing circuitry 84, processor 86 and/or radio interface 82, a downlink control information (DCI) in a Control Resource Set, CORESET, the DCI comprising a transmission configuration indication (TCI) field indicating a TCI codepoint, the TCI codepoint indicating a first and/or a second TCI state, the first TCI state being associated with the first TRP and the second TCI state being associated with the second TRP. The method may include receiving (Block S144), such as via determiner unit 34 in processing circuitry 84, processor 86 and/or radio interface 82, the PDSCH scheduled by the DCI by rate matching around either a first set or a second set of CRS patterns, or both the first and the second set of CRS patterns according to at least one the indicated TCI state and the CORESET. In some embodiments, since the UE 22 is receiving, rather than transmitting, the "rate matching" at the UE 22 may be considered "rate-dematching".

In some embodiments, the method includes receiving, such as via determiner unit 34 in processing circuitry 84, processor 86 and/or radio interface 82, a downlink control information (DCI) in a first or a second Control Resource Set, CORESET, the first and second CORESETs being respectively associated with the first and the second set of CRS patterns. The DCI schedules the PDSCH and comprises a transmission configuration indication (TCI) field indicating a TCI codepoint, the TCI codepoint indicating a first and/or a second TCI state, the first TCI state being associated with the first TRP and the second TCI state being associated with the second TRP. The method includes receiving, such as via determiner unit 34 in processing circuitry 84, processor 86 and/or radio interface 82, the PDSCH by rate matching around either only the first set of CRS patterns, the second set of CRS patterns, or both the first set of CRS patterns and the second set of CRS patterns according to at least one of the indicated first or the second TCI state and the first or the second CORESET.

In some embodiments, the PDSCH is a New Radio (NR) PDSCH and the CRS patterns are Long Term Evolution (LTE) CRS patterns. In some embodiments, the first TCI state is associated with a third set of CRS patterns and the second TCI state is associated with a fourth set of CRS patterns.

In some embodiments, determining that only the first set of CRS patterns is used for rate matching around the first set of layers comprises determining, such as via determiner unit 34, processing circuitry 84, processor 86, radio interface 82, that the first set of CRS patterns are a subset of the third set of CRS patterns and that the second set of CRS patterns is not a subset of the third set of CRS patterns. In some embodiments, determining that both the first set and the second set of CRS patterns are used for rate matching around the first set of layers comprises determining, such as via determiner unit 34, processing circuitry 84, processor 86, radio interface 82, that both the first set of CRS patterns are a subset of the third set of CRS patterns and the second set of CRS patterns are a subset of the third set of CRS patterns.

In some embodiments, the association between a TCI state and a respective TRP is determined by a quasi co-location (QCL) relation. In some embodiments, the first set of CRS patterns comprises a CRS pattern that at least partially overlaps in bandwidth with at least one CRS pattern comprised in the second set of CRS patterns.

Having generally described arrangements for rate matching for Non-coherent Joint-Transmission (NC-JT) with dynamic spectrum sharing, detailed functions and processes are provided as follows, and which may be implemented by the network node 16, user equipment 22 and/or host computer 24.

Some embodiments may be discussed herein in terms of two different TRPs, which may be two different TRPs of two different network nodes 16; however, in some embodiments, the two different TRPs may be associated with the same network node 16.

Some embodiments may assume that both DSS and NC-JT are used simultaneously for a UE 22. For DSS, and if we first assume a single TRP, e.g., a single PDSCH, then the UE 22 may in the general case be configured with a set of LTE CRS patterns (up to four such patterns may be considered in practical operator deployments) for rate matching purposes. This is because the NR carrier is in the typical case wider than the LTE carrier. Hence, if carrier aggregation (CA) is used for LTE, there may be multiple LTE CRS patterns, each associated with an individual LTE carrier, overlapping with the bandwidth of the NR carrier. In some embodiments, these multiple LTE CRS pattern may be denoted as a set of LTE CRS patterns, which may be configured to the UE 22 by RRC signaling. Hence, when performing mapping of PDSCH modulation symbols onto the time-frequency resource grid for the different PDSCH layers, the UE 22 may assume that the REs occupied by the multiple CRS patterns in the configured set of CRS patterns are not available for PDCSH, i.e., PDSCH is rate matched around the LTE CRS patterns.

Figure 22:
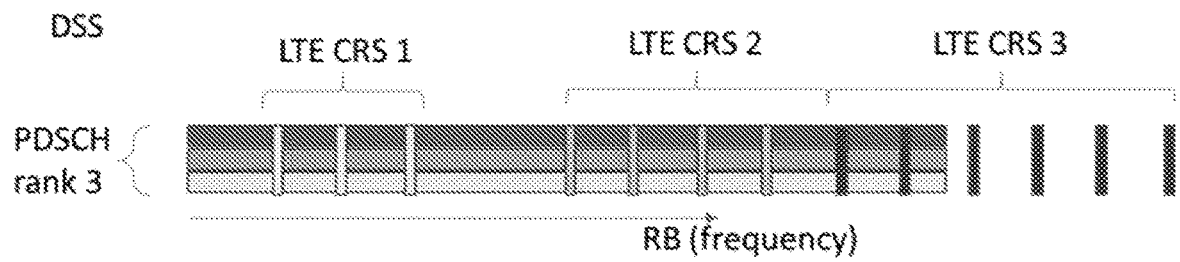
FIG. 22 illustrates an example DSS use case according to some embodiments of the present disclosure.

An example is shown in FIG. 22 where a set of three LTE CRS patterns (indicated as LTE CRS 1, LTE CRS 2, and LTE CRS 3 in FIG. 22) are configured for the UE 22 and a PDSCH of three layers (rank 3) is scheduled to the UE 22. The PDSCH avoids the REs used by the LTE CRS for all the CRS sets.

Multi-DCI Scheduling of NC-JT

Now, for NC-JT, and with multi-DCI scheduling, the UE 22 receives two PDSCH from two different transmission points. In specification language, the two PDSCH have different source RS for the QCL assumption when receiving the PDSCH DMRS. These two source RS, which may be a CSI-RS, are thus transmitted from the two TRPs (e.g., network nodes 16), respectively. Which QCL source RS the UE 22 assumes for receiving PDSCH and the PDSCH DMRS is indicated to the UE 22 by a TCI state, either implicitly, according to a pre-determined rule in the specification, by assuming the TCI state is the same one as for the PDCCH DMRS that scheduled the PDSCH, or explicitly indicated in the DCI carried by the PDCCH.

The PDSCH DMRS may be grouped into two or three CDM groups, depending on the configured DMRS type. Which CDM group is used for PDSCH DMRS may be indicated in the scheduling DCI (transmitted by network node 16) by a DMRS port table. In NC-JT, the PDSCH received from different TRPs (e.g., network nodes 16) may have DMRS that use different CDM groups. For example, TRP0 (e.g., network node 16*a*) uses CDM group 0 and TRP1 (e.g., network node 16*b*) uses CDM group 1. This can be semi-statically configured to the two TRPs participating in the NC-JT transmissions, e.g., by some higher order network node.

An aspect of this present disclosure is that the set of CRS patterns may be associated with the DMRS CDM group. Hence, in this embodiment, a first TRP (e.g., network node 16*a*) is using a first DMRS CDM group for PDSCH DMRS and the PDSCH layers transmitted from this TRP is rate matched around the REs which are occupied by the LTE CRS of the first set of CRS patterns. Likewise, a second TRP (e.g., network node 16*b*) is using a second DMRS CDM group for PDSCH DMRS and the PDSCH layers transmitted from this second TRP is rate matched around the REs which are occupied by the LTE CRS of the second set of CRS patterns. In some embodiments, the UE 22 is receiving both the first and the second PDSCH simultaneously (in the same OFDM symbols) although the PDSCHs may not be completely overlapping in terms of used resource blocks, and the PDSCHs may even be scheduled as non-overlapping. The UE 22 may be pre-configured over RRC with a semi-static mapping between CDM group index $\lambda=0,1,2$ and LTE CRS set index from a list of configured LTE CRS sets, each associated with a respective TRP. In some embodiments, as a result of reading the DMRS port table field of the scheduling DCI (received by network node 16), the UE 22 is aware of which CDM group the PDSCH DMRS belongs to and can (e.g., based on the pre-configured association) determine which LTE CRS pattern set to apply for rate matching of the PDSCH. Another option may be that the UE 22 is conveyed the mapping between CDM group index and LTE CRS set index over more dynamic signaling, such as layer-2 medium access control (MAC) control element (CE)

signaling. This may enable the network node 16 to update the mapping more frequently and thus more dynamically switch which TRPs participate in the NC-JT to the UE 22.

In some embodiments, there are separate PDSCHs scheduled by separate DCIs where the same LTE CRS rate matching is applied for all layers of the respective PDSCH. PDSCH rate matching around which LTE CRS pattern may be indicated via the TCI state. If the network semi-statically associates a CDM group with an LTE CRS pattern set, there would likely be an RRC reconfigure every time there is a switch between serving TRPs, e.g., the coordination cluster size is equal to the serving TRP set. If instead the network node 16 and/or UE 22 associates an LTE CRS pattern set with a TCI state, there can be e.g., 5 TRPs in the coordination cluster, each associated with a TCI state, such that dynamically switching serving TRPs from within the cluster without RRC reconfiguration of CDM group to LTE CRS set mapping may be enabled.

In some embodiments, the set of LTE CRS patterns are associated with a TCI state (TCI state may be signaled in a DCI). Hence, by selecting a TCI state, the network node 16 (e.g., gNB) can also control the used set of LTE CRS patterns. This can be useful in case some TRPs transmit CRS while some other TRPs do not transmit CRS. In this case, the TCI state, which basically selects the TRP used for PDSCH transmission (through the source RS for QCL assumption), simultaneously determines the rate matching around CRS. This can also enable the network node 16 to dynamically, via e.g., layer-1 DCI signaling, switch which TRPs are serving the UE 22 in the NC-JT. For instance, if five TRPs, each with a respective set of LTE CRS patterns are part of a coordination cluster, the UE 22 may be configured with five TCI states respectively indicating a QCL source RS and a set of LTE CRS patterns for each of the five TRPs in the coordination cluster.

For example, when configuring (e.g., by the network node 16) the TCI state to the UE 22, then each TCI state may include an index to a set of LTE CRS patterns. If the UE 22 is scheduled with a PDSCH with that TCI state, then the UE 22 assumes that the PDSCH is rate matched around the set of LTE CRS patterns associated with that TCI state (e.g., indicated by an index value associated with that TCI state by e.g., a table).

Another alternative is that the set of LTE CRS patterns are higher layer configured and/or are semi-static. In this case, the UE 22 is configured (e.g., by network node 16) with two PDSCH_Config messages and/or two PDCCH_Config messages by RRC signaling, and each PDSCH_Config or PDCCH_Config includes an independently assigned set of LTE CRS patterns. When scheduled by a PDCCH associated with a PDCCH_config, or when scheduling a PDSCH associated with a PDSCH_config, then the UE 22 may assume that the PDSCH is rate matched around the set of LTE CRS patterns associated with that configuration message. Different PDCCH configurations can be associated with different CORESETs. A PDCCH Config used for a PDCCH can be determined by the CORESET over which the PDCCH is detected. Similarly, a PDSCH Config used for a PDSCH can be determined by the CORESET over which a corresponding PDCCH scheduling the PDSCH is detected, or by the associated PDCCH Config.

For the cases where the PDSCH DMRS antenna ports are QCL with the source RS(s) in the TCI state activated for the PDCCH, i.e., the same TCI state for the PDCCH is also used for the PDSCH scheduled by the PDCCH, one or more of the following arrangements may be applied. Examples of three of such cases when this occurs are given below:

when the TCI field is not present in the case of DCI format 1-1 (i.e., the higher layer configured tci-PresentInDCI field indicates that TCI field is not present in DCI), in the case of DCI format 1-0 where the TCI field is not present, and/or when the time offset between the reception of the DL DCI and the corresponding PDSCH is less than the threshold Threshold-Sched-Offset.

In some aspects of the present disclosure, the above embodiments can be easily adapted to handle also these use cases. Hence, in one embodiment, the TCI state activated for a PDCCH determines the CRS rate matching for the PDSCH scheduled by a DCI carried by PDCCH. For instance, the TCI state activated for PDCCH may include an index to a set of LTE CRS patterns. If the UE 22 is scheduled with a PDSCH by a DCI transmitted in a PDCCH, then the PDSCH may be rate match (e.g., by network node 16) around the set of LTE CRS patterns associated with the TCI state activated for the PDCCH. It is noted that the TCI state activated for PDCCH are activated per CORESET (e.g., a TCI state activated in CORESET p means that the activated TCI state provides the QCL source RS for PDCCH received in CORESET p). Since multiple CORESETs can be configured per UE 22, this embodiment may provide the possibility for rate matching around one or more sets of LTE CRS patterns depending on in which CORESET the PDCCH carrying the scheduling DCI is received in. Consider the following example:

A UE 22 receives PDSCH1 in the slot scheduled by a DCI carried by PDCCH1. PDCCH1 is received in CORESET1, and CORESET1 has TCI state 1 activated. TCI state 1 includes an index (e.g., an index value) to a $1^{st}$ set of LTE CRS patterns.

The UE 22 also receives PDSCH2 in the same slot scheduled by another DCI carried by PDCCH2. PDCCH2 is received in CORESET2, and CORESET2 has TCI state 2 activated. TCI state 2 includes an index (e.g., an index value) to a $2^{nd}$ set of LTE CRS patterns.

In the above example, PDSCH1 is rate matched around the 1st set of LTE CRS patterns and PDSCH2 is rate matched around the 2nd set of LTE CRS patterns. In another variant of the embodiment, it is possible to define a rule that PDSCH1 rate matches around both the 1st set and the 2nd set of LTE CRS patterns.

Note that one or more embodiments discussed herein can provide the flexibility for the network to dynamically, via e.g., layer-2 MAC CE signaling as defined in NR Rel-15, which set of LTE CRS patterns to rate match around. By activating a different TCI state for a given CORESET via Layer-2, the TCI state activated for the PDCCH can be changed. Hence, this can allow for the set of LTE CRS rate matching patterns to change.

Figure 23:
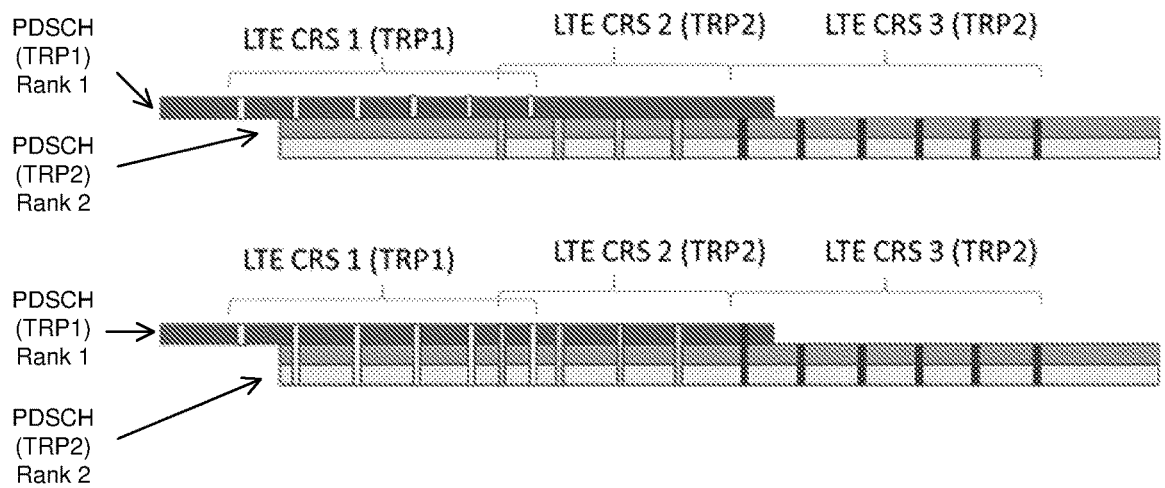
FIG. 23 illustrates alternative 1 and 2 in the PDSCH to RE mapping for the two PDSCH in multi-DCI scheduling with independently configured sets of LTE CRS patterns according to some embodiments of the present disclosure.

In NC-JT, the UE 22 receives two PDSCHs simultaneously, and according to some embodiments of the present disclosure described above, there are at least two alternatives when it comes to rate matching:

1. A PDSCH is rate matched around the set of LTE CRS associated with the TRP transmitting that PDSCH only, e.g., the LTE CRS associated with the TCI state or the CDM group.
2. Both PDSCH are rate matched around the two sets of LTE CRS associated with the TRPs respectively transmitting the first and second of the PDSCHs, i.e., the union of the LTE CRS patterns, e.g. the union of the LTE CRS patterns indicated by both TCI states or both CDM groups These two alternatives are illustrated in FIG. 23 (the top diagram shows alternative 1 and the bottom diagram shows alternative 2). A benefit of alternative 1 is the lower overhead since RE used by LTE CRS of the second PDSCH can still be used for PDSCH transmission of the first PDSCH and vice versa. On the other hand, a benefit of Alternative 2 is less interference for LTE terminals since the LTE CRS is not interfered by a PDSCH transmission from the neighboring TRP.

Note that the two sets of LTE CRS patterns may be overlapping, so the UE 22 may be performing rate matching around multiple CRS patterns in the same RB, in the case of Alternative 2. Alternative 2 may be implemented as a rule creating a dependency between the two DCIs scheduling overlapping PDSCHs, e.g., the UE 22 reads both DCIs in order to decode each PDSCH in order to determine the rate matching of that PDSCH. A downside with this approach is that both PDSCHs are lost in case the UE 22 incorrectly decodes, or "misdetects", one of the DCIs.

In some embodiments, full scheduling information for receiving a PDSCH is indicated and carried only by the corresponding PDCCH. In some embodiments, LTE CRS rate matching pattern that is dynamically indicated via DCI as part of the scheduling information Single DCI Scheduling of NC-JT In single DCI scheduling for NC-JT, the PDCCH (e.g., via DCI) schedules a PDSCH where the layers are split into two groups, and where each group is transmitted from a TRP. In this case, a TCI codepoint in the DCI indicates two TCI states, where each TCI state is further associated with a DMRS CDM group. The layers of the first group use the DMRS of the first CDM group and the layers of the second group use the DMRS of the second DMRS CDM group. Some embodiments can also handle this case, like the multi-DCI case discussed above. Like in the multi-DCI case, each DMRS CDM group can be associated with a set of LTE CRS patterns and the layers associated with a CDM group would rate match around the corresponding set of LTE CRS patterns. Alternatively, or additionally, in some embodiments, each TCI state of a TCI codepoint in DCI can be associated with a set of LTE CRS patterns and a PDSCH is rate matched around a set of LTE CRS patterns indicated by a TCI state indicated in a DCI scheduling the PDSCH.

Also, in this case, there are at least two alternatives for how the PDSCH layers are rate matched around the two sets of LTE CRS patterns, such as:
1. A PDSCH layer is rate matched around the set of LTE CRS associated with that PDSCH layer only.
2. All PDSCH layers are rate matched around the set of LTE CRS associated with both groups of layers, i.e., the union of the LTE CRS patterns assigned to all the layers.

Figure 24:
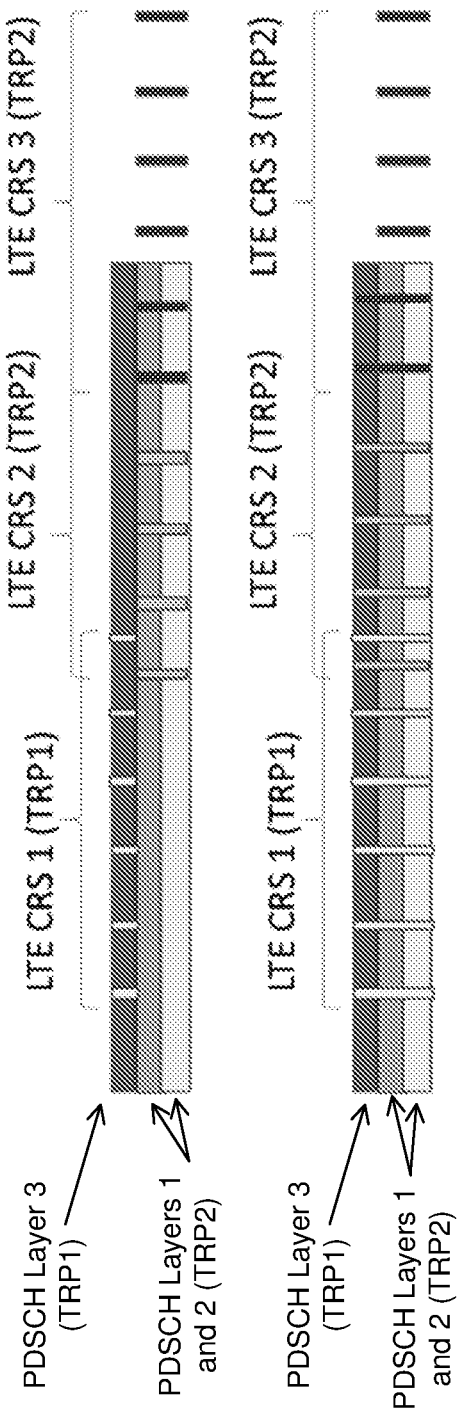
FIG. 24 illustrates alternative 1 and 2 in the PDSCH to RE mapping for the two layer groups for a PDSCH in single-DCI scheduling with independently configured sets of LTE CRS patterns per layer group according to some embodiments of the present disclosure.

FIG. 24 illustrates examples of alternatives 1 and 2 (top diagram shows alternative 1 and bottom diagram shows alternative 2) in the PDSCH-to-RE mapping for the two layer groups for a PDSCH in single-DCI scheduling with independently configured sets of LTE CRS patterns per layer group.

In another embodiment, two or more sets of LTE CRS patterns are higher layer configured in a PDSCH Configuration message for a UE 22 by RRC signaling. In some embodiments, a PDSCH is always rate matched around the union of two or more sets of LTE CRS patterns regardless of the layer groups.

An Alternative Embodiment B

In an alternative embodiment B, focusing on the single-DCI case, dynamic switching between Alternative 1 and Alternative 2 above can be attained. For example, assume two TRPs, a first and a second TRP, are participating in a NC-JT and that the first TRP is associated with a first set of LTE CRS patterns and the second TRP is associated with a second set of LTE CRS patterns, where the first and second set of LTE CRS patterns in the general case may overlap in bandwidth. Each TRP is further associated with one or more respective TCI states and codepoints of the TCI field indicated two TCI states. At least a subset of the TCI codepoints are associated with two respective TCI states, where the TCI codepoint specific two respective TCI states are associated with the first and second TRP, respectively. Now, each TCI state may also associated with a set of LTE CRS rate matching patterns.

A feature of this embodiment of the present disclosure is that two separate TCI codepoints may indicate a different pair of TCI states, but where each pair of TCI states (respectively associated with a TCI codepoint) are associated with both the first and second TRP (via the QCL source RS relation), but where the associated sets of LTE CRS rate matching patterns are different. This may allow a network node 16 to dynamically switch the rate matching strategy according to Alternative 1 and Alternative 2 of the previous embodiments by indicating different TCI codepoints.

Consider a TCI codepoint indicating a first and a second TCI state, the first TCI state being associated with a third set of LTE CRS patterns (and the first TRP) and the second TCI state being associated with a fourth set of LTE CRS patterns. If the network node 16 desires to achieve the rate matching strategy according to Alternative 1, the network node 16 configures the third set of LTE CRS patterns to include (or be equal to) the first set of LTE CRS patterns (i.e., the first set is a subset of the third set) but does not configure the third set of LTE CRS patterns to include LTE CRS patterns of the second set of LTE CRS patterns. Additionally, the network node 16 configures the fourth set of LTE CRS patterns to include (or be equal to) the second set of LTE CRS patterns but does not configure the fourth set of LTE CRS patterns to include LTE CRS patterns of the first set of LTE CRS patterns.

Conversely, if the network node 16 desires to achieve the rate matching strategy according to Alternative 2, the network node 16 configures both the third set as well as the fourth set of LTE CRS patterns to include both the LTE CRS patterns of the first set and the second set. In other words, the third and fourth set may be equal and characterized by both being the superset of the first and second set.

By configuring two different TCI codepoints according to the above two different strategies, dynamic switching between rate matching alternatives can be attained.

Figure 25:
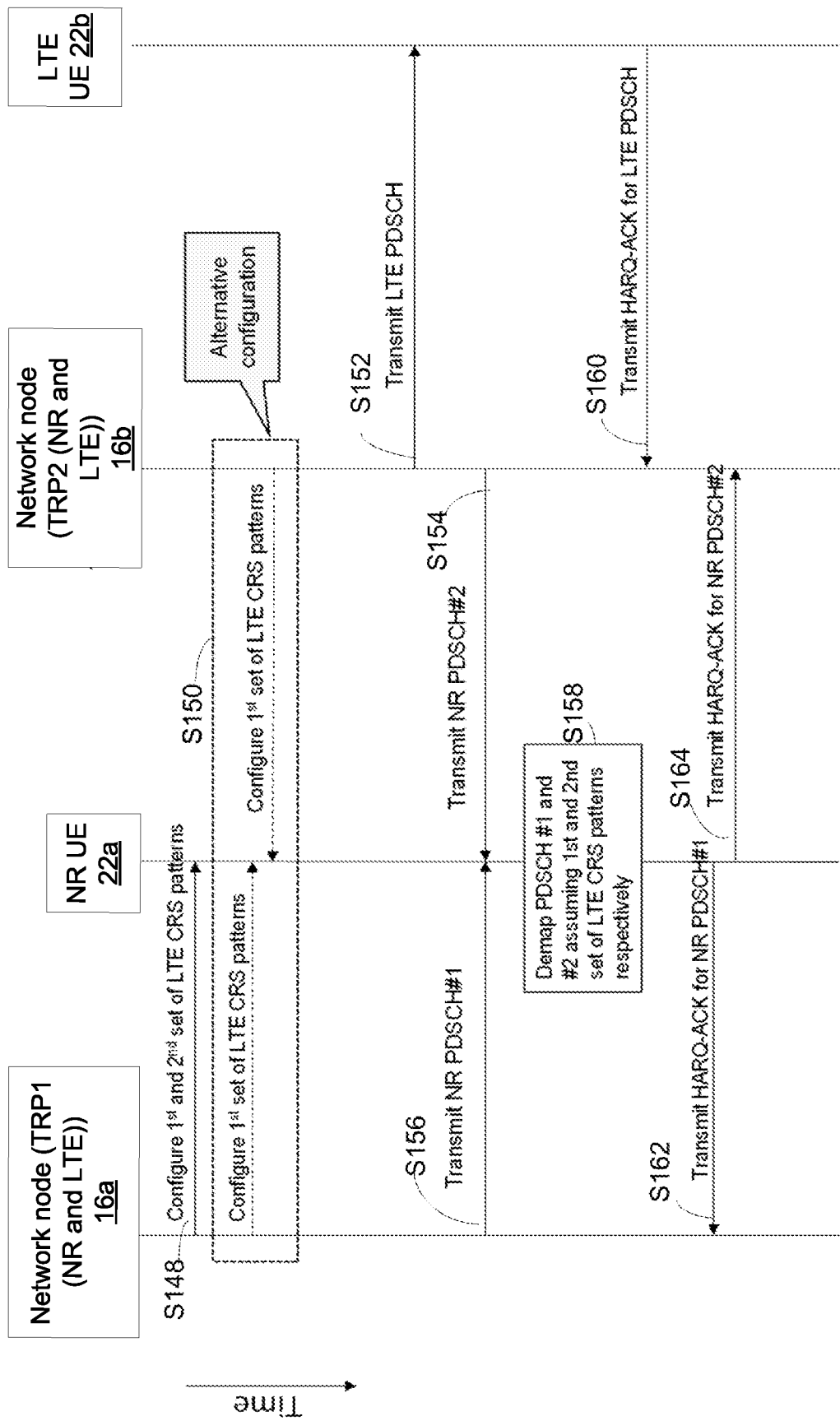
FIG. 25 is a flowchart that illustrates an example method according to some embodiments of the present disclosure.

FIG. 25 is a call flow diagram illustrating an example embodiment of the present disclosure. In some embodiments, in step S148, the NR UE 22 is configured with two sets of LTE CRS patterns. Either the two sets of LTE CRS patterns are configured by RRC from one of the TRPs (see step S148), or two separate RRC messages are used, from each of the two TRPs, respectively (see alternative/optional step S150). The LTE UE 22b may receive an LTE PDSCH in step S152. The TRP may schedule and 148 transmit a PDSCH to the LTE UE 22, in another slot/subframe, or in the same subframe but frequency multiplexed with the NR PDSCH(s).

The NR UE 22*a* receives two PDSCHs simultaneously, from the two TRPS in steps S154 and S156; and assumes that the network (e.g., network node/TRP1 16*a* and network node/TRP2 16*b*) transmits these two PDSCHs using the rate matching according to the configured sets of LTE CRS patterns. For example, in step S158, the NR UE 22*a* demaps/decodes/de-rate matches PDSCH #1 and #2 assuming the first and second set of LTE CRS patterns, respectively.

The NR and LTE UEs 22*a* and 22*b* feed back the associated HARQ-ACK for the received PDSCH(s), respectively, in steps S160 and S162 and S164. In FIG. 25, it may be assumed that the HARQ-ACK feedback is time division multiplexed (TDM), but also joint encoding of the HARQ-ACK for NR PDSCHs (i.e., in the same PUCCH) is a possibility in other embodiments.

Some embodiments may include one or more of the following:

1. A method, performed in a user equipment, for receiving one or more PDSCHs comprising a first set and a second set of layers wherein the DMRS of the first CDM group is associated with the first set of layers and the DMRS of the second CDM group is associated with the second set of layers, the method comprising one or more of:
   a. that the first and second set of layers further being respectively associated with a first and second set of CRS patterns; and/or
   b. receiving the one or multiple PDSCHs according to a defined mapping of PDSCH-to-RE per layer, where the mapping depends on the first and/or the second CRS patterns.
2. The method of embodiment 1, wherein the defined mapping teaches that the PDSCH layers associated to the first CDM group are not mapped to CRS RE associated with the first CDM group and that the PDSCH layers associated to the second CDM group are not mapped to CRS RE associated with the second CDM group.
3. The method of embodiment 2, wherein the defined mapping teaches that the PDSCH layers associated to the first CDM group are mapped to CRS RE associated with the second CDM group and that the PDSCH layers associated to the second CDM group are mapped to CRS RE associated with the first CDM group.
4. The method of embodiment 1, wherein the defined mapping teaches that the PDSCH layers of the first CDM group are not mapped to CRS RE associated with the first and second CDM group and that the PDSCH layers of the second CDM group are not mapped to CRS RE associated with the first and second CDM group
5. The method of embodiment 1, where the association between the association between a set of layers and a set of CRS patterns are obtained by indication using a TCI state or a TCI code point.
6. The method of embodiment 1, wherein the first set of layers belongs to a first PDSCH and the second set of layers belong to a second PDSCH
7. The method of embodiment 6, wherein each PDSCH is scheduled by a PDCCH containing a TCI state that is associated with a set of CRS patterns.

Some additional embodiments may include one or more of the following:

8. A method, performed in a user equipment, for receiving a PDSCH comprising a first set of layers associated with a first TRP and a second set of layers associated with a second TRP, the first and second TRP further being respectively associated with a first and second set of CRS patterns, the method comprising one or more of:
   i. receiving a DCI comprising a TCI field indicating a TCI codepoint indicating a first and a second TCI state, wherein the first TCI state is associated with the first TRP and the second TCI state is associated with the second TRP;
   ii. determining, responsive to the indicated TCI codepoint, whether either only the first set of CRS patterns or both the first set of CRS patterns and the second set of CRS patterns are used for rate matching around the first set of layers; and/or
   iii. receiving the PDSCH according to the determined rate matching.
9. The method of embodiment 8, wherein the first TCI state is associated with a third set of CRS patterns [and the second TCI state is associated with a fourth set of CRS patterns].
10. The method of embodiment 9, wherein determining that only the first set of CRS patterns is used for rate matching around the first set of layers comprises determining that the first set of CRS patterns are a subset of the third set of CRS patterns and that the second set of CRS patterns is not a subset of the third set of CRS patterns.
11. The method of embodiment 9, wherein determining that both the first set and the second set of CRS patterns are used for rate matching around the first set of layers comprises determining that both the first set of CRS patterns are a subset of the third set of CRS patterns and the second set of CRS patterns are a subset of the third set of CRS patterns.
12. The method of embodiment 8, wherein the association between a TCI state and a TRP is given by a QCL relation.
13. The method of embodiment 8, wherein the first set of CRS patterns comprises a CRS pattern which overlaps in bandwidth with at least one CRS pattern comprised in the second set of CRS patterns.

Some embodiments may include one or more of the following:

NOTE: In the embodiments, transmission point (TRP) can be understood as network node.

Embodiment A1-a. A network node configured to communicate with a wireless device (WD) for transmitting one or more physical downlink shared channels (PDSCHs) comprising a first set of layers and a second set of layers in which a DMRS of a first code division multiplexing (CDM) group is associated with the first set of layers and a DMRS of a second CDM group is associated with the second set of layers, the network node configured to, and/or comprising a radio interface and/or comprising processing circuitry configured to:

transmit the one or more PDSCHs according to a PDSCH resource mapping, the PDSCH resource mapping based at least in part on a first cell-specific reference signal (CRS) pattern and/or a second CRS pattern, the first CRS pattern and the second CRS pattern being associated with the first set of layers and the second set of layers, respectively.

Embodiment A2-a. The network node of Embodiment A1-a, wherein one or more of:

the PDSCH resource mapping is a PDSCH-to-resource element (RE) per layer;

the one or more PDSCHs are New Radio (NR) PDSCHs and the CRS patterns are Long Term Evolution (LTE) CRS patterns;

the mapping indicates that the first set of layers associated to the first CDM group are not mapped to CRS RE(s) associated with the first CDM group and that the second set of layers associated to the second CDM group are not mapped to CRS RE(s) associated with the second CDM group;

the mapping indicates that the first set of layers associated to the first CDM group are mapped to CRS RE(s) associated with the second CDM group and that the second set of layers associated to the second CDM group are mapped to CRS RE(s) associated with the first CDM group;

the mapping indicates that the first set of layers of the first CDM group are not mapped to CRS RE(s) associated with the first and second CDM group and that the second set of layers of the second CDM group are not mapped to CRS RE(s) associated with the first and second CDM group;

the association between the first and second set of layers and the respective first and second set of CRS patterns are obtained by indication using a transmission configuration indication (TCI) state or a TCI code point;

the first set of layers belongs to a first PDSCH and the second set of layers belong to a second PDSCH; and/or each PDSCH is scheduled by a physical downlink control channel (PDCCH) including a TCI state that is associated with a set of CRS patterns.

Embodiment A1-b. A network node configured to communicate with a wireless device (WD) for transmitting a physical downlink shared channel (PDSCH) comprising a first set of layers associated with a first transmission point (TRP) and a second set of layers associated with a second TRP, the first and second TRPs further being respectively associated with a first and second set of CRS patterns, the network node configured to, and/or comprising a radio interface and/or comprising processing circuitry configured to:

transmit a downlink control information (DCI), the DCI comprising a transmission configuration indication (TCI) field indicating a TCI codepoint, the TCI codepoint indicating a first and a second TCI state, the first TCI state being associated with the first TRP and the second TCI state being associated with the second TRP; and/or transmit the PDSCH according to a rate matching, the rate matching associated with the indicated TCI codepoint by the TCI codepoint indicating whether either only the first set of CRS patterns or both the first set of CRS patterns and the second set of CRS patterns are used for the rate matching around the first set of layers.

Embodiment A2-b. The network node of Embodiment A1-b, wherein one or more of:
the PDSCH is a New Radio (NR) PDSCH and the CRS patterns are Long Term Evolution (LTE) CRS patterns;
the first TCI state is associated with a third set of CRS patterns and the second TCI state is associated with a fourth set of CRS patterns;
the first set of CRS patterns are a subset of the third set of CRS patterns and that the second set of CRS patterns is not a subset of the third set of CRS patterns;
both the first set of CRS patterns are a subset of the third set of CRS patterns and the second set of CRS patterns are a subset of the third set of CRS patterns;
the association between a TCI state and a respective TRP is determined by a quasi co-location (QCL) relation; and/or
the first set of CRS patterns comprises a CRS pattern that at least partially overlaps in bandwidth with at least one CRS pattern comprised in the second set of CRS patterns.

Embodiment B1-a. A method implemented in a network node for transmitting one or more physical downlink shared channels (PDSCHs) comprising a first set of layers and a second set of layers in which a DMRS of a first code division multiplexing (CDM) group is associated with the first set of layers and a DMRS of a second CDM group is associated with the second set of layers, the method comprising:

transmitting the one or more PDSCHs according to a PDSCH resource mapping, the PDSCH resource mapping based at least in part on a first cell-specific reference signal (CRS) pattern and/or a second CRS pattern, the first CRS pattern and the second CRS pattern being associated with the first set of layers and the second set of layers, respectively.

Embodiment B2-a. The method of Embodiment B1-a, wherein one or more of:
the PDSCH resource mapping is a PDSCH-to-resource element (RE) per layer;
the one or more PDSCHs are New Radio (NR) PDSCHs and the CRS patterns are Long Term Evolution (LTE) CRS patterns;
the mapping indicates that the first set of layers associated to the first CDM group are not mapped to CRS RE(s) associated with the first CDM group and that the second set of layers associated to the second CDM group are not mapped to CRS RE(s) associated with the second CDM group;
the mapping indicates that the first set of layers associated to the first CDM group are mapped to CRS RE(s) associated with the second CDM group and that the second set of layers associated to the second CDM group are mapped to CRS RE(s) associated with the first CDM group;
the mapping indicates that the first set of layers of the first CDM group are not mapped to CRS RE(s) associated with the first and second CDM group and that the second set of layers of the second CDM group are not mapped to CRS RE(s) associated with the first and second CDM group;
the association between the first and second set of layers and the respective first and second set of CRS patterns are obtained by indication using a transmission configuration indication (TCI) state or a TCI code point;
the first set of layers belongs to a first PDSCH and the second set of layers belong to a second PDSCH; and/or
each PDSCH is scheduled by a physical downlink control channel (PDCCH) including a TCI state that is associated with a set of CRS patterns.

Embodiment B1-b. A method implemented in a network node for transmitting a physical downlink shared channel (PDSCH) comprising a first set of layers associated with a first transmission point (TRP) and a second set of layers associated with a second TRP, the first and second TRPs further being respectively associated with a first and second set of CRS patterns, the method comprising:

transmitting a downlink control information (DCI), the DCI comprising a transmission configuration indication (TCI) field indicating a TCI codepoint, the TCI codepoint indicating a first and a second TCI state, the first TCI state being associated with the first TRP and the second TCI state being associated with the second TRP; and/or transmitting the PDSCH according to a rate matching, the rate matching associated with the indicated TCI codepoint by the TCI codepoint indicating whether either only the first set of CRS patterns or both the first set of CRS patterns and the second set of CRS patterns are used for the rate matching around the first set of layers.

Embodiment B2-b. The method of Embodiment B1-b, wherein one or more of:
- the PDSCH is a New Radio (NR) PDSCH and the CRS patterns are Long Term Evolution (LTE) CRS patterns;
- the first TCI state is associated with a third set of CRS patterns and the second TCI state is associated with a fourth set of CRS patterns;
- the first set of CRS patterns are a subset of the third set of CRS patterns and that the second set of CRS patterns is not a subset of the third set of CRS patterns;
- both the first set of CRS patterns are a subset of the third set of CRS patterns and the second set of CRS patterns are a subset of the third set of CRS patterns;
- the association between a TCI state and a respective TRP is determined by a quasi co-location (QCL) relation; and/or
- the first set of CRS patterns comprises a CRS pattern that at least partially overlaps in bandwidth with at least one CRS pattern comprised in the second set of CRS patterns.

Embodiment C1-a. A wireless device (WD) configured to communicate with at least one network node for receiving one or more physical downlink shared channels (PDSCHs) comprising a first set of layers and a second set of layers in which a DMRS of a first code division multiplexing (CDM) group is associated with the first set of layers and a DMRS of a second CDM group is associated with the second set of layers, the WD configured to, and/or comprising a radio interface and/or processing circuitry configured to:
receive the one or more PDSCHs according to a PDSCH resource mapping, the PDSCH resource mapping based at least in part on a first cell-specific reference signal (CRS) pattern and/or a second CRS pattern, the first CRS pattern and the second CRS pattern being associated with the first set of layers and the second set of layers, respectively.

Embodiment C2-a. The WD of Embodiment C1-a, wherein one or more of:
- the PDSCH resource mapping is a PDSCH-to-resource element (RE) per layer;
- the one or more PDSCHs are New Radio (NR) PDSCHs and the CRS patterns are Long Term Evolution (LTE) CRS patterns;
- the mapping indicates that the first set of layers associated to the first CDM group are not mapped to CRS RE(s) associated with the first CDM group and that the second set of layers associated to the second CDM group are not mapped to CRS RE(s) associated with the second CDM group;
- the mapping indicates that the first set of layers associated to the first CDM group are mapped to CRS RE(s) associated with the second CDM group and that the second set of layers associated to the second CDM group are mapped to CRS RE(s) associated with the first CDM group;
- the mapping indicates that the first set of layers of the first CDM group are not mapped to CRS RE(s) associated with the first and second CDM group and that the second set of layers of the second CDM group are not mapped to CRS RE(s) associated with the first and second CDM group;
- the association between the first and second set of layers and the respective first and second set of CRS patterns are obtained by indication using a transmission configuration indication (TCI) state or a TCI code point;
- the first set of layers belongs to a first PDSCH and the second set of layers belong to a second PDSCH; and/or
- each PDSCH is scheduled by a physical downlink control channel (PDCCH) including a TCI state that is associated with a set of CRS patterns.

Embodiment C1-b. A wireless device (WD) configured to communicate with at least one network node for receiving a physical downlink shared channel (PDSCH) comprising a first set of layers associated with a first transmission point (TRP) and a second set of layers associated with a second TRP, the first and second TRPs further being respectively associated with a first and second set of CRS patterns, the WD configured to, and/or comprising a radio interface and/or processing circuitry configured to:
- receive a downlink control information (DCI), the DCI comprising a transmission configuration indication (TCI) field indicating a TCI codepoint, the TCI codepoint indicating a first and a second TCI state, the first TCI state being associated with the first TRP and the second TCI state being associated with the second TRP;
- determine, responsive to the indicated TCI codepoint, whether either only the first set of CRS patterns or both the first set of CRS patterns and the second set of CRS patterns are used for rate matching around the first set of layers; and/or
- receive the PDSCH according to the determined rate matching.

Embodiment C2-b. The WD of Embodiment C1-b, wherein one or more of:
- the PDSCH is a New Radio (NR) PDSCH and the CRS patterns are Long Term Evolution (LTE) CRS patterns;
- the first TCI state is associated with a third set of CRS patterns and the second TCI state is associated with a fourth set of CRS patterns;
- determining that only the first set of CRS patterns is used for rate matching around the first set of layers comprises determining that the first set of CRS patterns are a subset of the third set of CRS patterns and that the second set of CRS patterns is not a subset of the third set of CRS patterns;
- determining that both the first set and the second set of CRS patterns are used for rate matching around the first set of layers comprises determining that both the first set of CRS patterns are a subset of the third set of CRS patterns and the second set of CRS patterns are a subset of the third set of CRS patterns;
- the association between a TCI state and a respective TRP is determined by a quasi co-location (QCL) relation; and/or
- the first set of CRS patterns comprises a CRS pattern that at least partially overlaps in bandwidth with at least one CRS pattern comprised in the second set of CRS patterns.

Embodiment D1-a. A method implemented in a wireless device (WD) for receiving one or more physical downlink shared channels (PDSCHs) comprising a first set of layers and a second set of layers in which a DMRS of a first code division multiplexing (CDM) group is associated with the first set of layers and a DMRS of a second CDM group is associated with the second set of layers, the method comprising:
receiving the one or more PDSCHs according to a PDSCH resource mapping, the PDSCH resource mapping based at least in part on a first cell-specific reference signal (CRS) pattern and/or a second CRS pattern, the first CRS pattern and the second CRS pattern being associated with the first set of layers and the second set of layers, respectively.

Embodiment D2-a. The method of Embodiment D1-a, wherein one or more of:
the PDSCH resource mapping is a PDSCH-to-resource element (RE) per layer;
the one or more PDSCHs are New Radio (NR) PDSCHs and the CRS patterns are Long Term Evolution (LTE) CRS patterns;
the mapping indicates that the first set of layers associated to the first CDM group are not mapped to CRS RE(s) associated with the first CDM group and that the second set of layers associated to the second CDM group are not mapped to CRS RE(s) associated with the second CDM group;
the mapping indicates that the first set of layers associated to the first CDM group are mapped to CRS RE(s) associated with the second CDM group and that the second set of layers associated to the second CDM group are mapped to CRS RE(s) associated with the first CDM group;
the mapping indicates that the first set of layers of the first CDM group are not mapped to CRS RE(s) associated with the first and second CDM group and that the second set of layers of the second CDM group are not mapped to CRS RE(s) associated with the first and second CDM group;
the association between the first and second set of layers and the respective first and second set of CRS patterns are obtained by indication using a transmission configuration indication (TCI) state or a TCI code point;
the first set of layers belongs to a first PDSCH and the second set of layers belong to a second PDSCH; and/or
each PDSCH is scheduled by a physical downlink control channel (PDCCH) including a TCI state that is associated with a set of CRS patterns.

Embodiment D1-b. A method implemented in a wireless device (WD) for receiving a physical downlink shared channel (PDSCH) comprising a first set of layers associated with a first transmission point (TRP) and a second set of layers associated with a second TRP, the first and second TRPs further being respectively associated with a first and second set of CRS patterns, the method comprising:
receiving a downlink control information (DCI), the DCI comprising a transmission configuration indication (TCI) field indicating a TCI codepoint, the TCI codepoint indicating a first and a second TCI state, the first TCI state being associated with the first TRP and the second TCI state being associated with the second TRP;
determining, responsive to the indicated TCI codepoint, whether either only the first set of CRS patterns or both the first set of CRS patterns and the second set of CRS patterns are used for rate matching around the first set of layers; and/or
receiving the PDSCH according to the determined rate matching.

Embodiment D2-b. The WD of Embodiment D1-b, wherein one or more of:
the PDSCH is a New Radio (NR) PDSCH and the CRS patterns are Long Term Evolution (LTE) CRS patterns;
the first TCI state is associated with a third set of CRS patterns and the second TCI state is associated with a fourth set of CRS patterns;
determining that only the first set of CRS patterns is used for rate matching around the first set of layers comprises determining that the first set of CRS patterns are a subset of the third set of CRS patterns and that the second set of CRS patterns is not a subset of the third set of CRS patterns;
determining that both the first set and the second set of CRS patterns are used for rate matching around the first set of layers comprises determining that both the first set of CRS patterns are a subset of the third set of CRS patterns and the second set of CRS patterns are a subset of the third set of CRS patterns;
the association between a TCI state and a respective TRP is determined by a quasi co-location (QCL) relation; and/or
the first set of CRS patterns comprises a CRS pattern that at least partially overlaps in bandwidth with at least one CRS pattern comprised in the second set of CRS patterns.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| CDM | Code Division Multiplexing (a way to generate antenna ports by using an orthogonal cover code, e.g. [1 1] and [1 −1] |
| CORESET | Control Resource Set |
| CRS | Cell specific reference signals (in LTE) |
| DM-RS | Demodulation reference signals (in NR) |
| DSS | Dynamic Spectrum Sharing |
| MAC | Medium Access Control |
| MAC CE | MAC Control Element |
| MU | Multi-user |
| NC-JT | Non-coherent Joint-Transmission |
| PDSCH | Physical Downlink Shared Channel |
| PDCCH | Physical Downlink Control Channel |
| QCL | Quasi Co-location |
| RB | Resource Block |
| RRC | Radio Resource Configuration |
| RS | Reference Signal |
| TCI | Transmission Configuration Indicator (in NR) |
| TRP | Transmission Point |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a user equipment (UE), the method comprising:
    receiving at least two physical downlink shared channels (PDSCHs);
    a first PDSCH of the at least two PDSCHs being associated with a first set of cell-specific reference signal (CRS) patterns, and a second PDSCH of the at least two PDSCHs being associated with a second set of CRS patterns;
    wherein the first PDSCH is assumed by the UE to be rate matched around resource elements associated with the first set of CRS patterns and the first PDSCH is scheduled by a first downlink control information (DCI) received in a first control resource set (CORESET) value associated with the first set of CRS patterns; and
    wherein the second PDSCH is assumed by the UE to be rate matched around resource elements associated with the second set of CRS patterns and the second PDSCH is scheduled by a second DCI received in a second CORESET value associated with the second set of CRS patterns, the first CORESET value being different from the second CORESET value.

2. The method of claim 1, wherein the at least two PDSCHs are associated with a first radio access technology (RAT) and the first and second sets of CRS patterns are associated with a second RAT.

3. The method of claim 2, wherein the first RAT is New Radio (NR) and the second RAT is Long Term Evolution (LTE).

4. The method of claim 1, wherein the at least two PDSCHs are received in a same slot.

5. The method of claim 1, wherein the first PDSCH is transmitted by a first network node and the second PDSCH is transmitted by a second network node, the second network node being different from the first network node.

6. The method of claim 1, wherein:
    the first PDSCH and the first set of CRS patterns are associated with at least one of a first transmission configuration indicator (TCI) state and a first code division multiplexing (CDM) group; and
    the second PDSCH and the second set of CRS patterns are associated with at least one of a second TCI state and a second CDM group.

7. The method of claim 1, further comprising:
    receiving a configuration indicating the first and second sets of CRS patterns; and
    receiving a downlink control information (DCI) scheduling at least one of the first and second PDSCHs, the DCI indicating the at least one of the first and second sets of CRS patterns in the configuration that the scheduled at least one of the first and second PDSCHs are to be rate matched around.

8. The method of claim 1, wherein the first and second PDSCHs are scheduled by a same DCI.

9. A user equipment (UE) configured to communicate with a network node, the user equipment comprising processing circuitry, the processing circuitry configured to cause the user equipment to:
    receive at least two physical downlink shared channels (PDSCHs);
    a first PDSCH of the at least two PDSCHs being associated with a first set of cell-specific reference signal (CRS) patterns and a second PDSCH of the at least two PDSCHs being associated with a second set of CRS patterns; and wherein the first PDSCH is assumed by the UE to be rate matched around resource elements associated with the first set of CRS patterns and the first PDSCH is scheduled by a first downlink control information (DCI) received in a first control resource set (CORESET) value associated with the first set of CRS patterns; and wherein the second PDSCH is assumed by the UE to be rate matched around resource elements associated with the second set of CRS patterns and the second PDSCH is scheduled by a second DCI received in a second CORESET value associated with the second set of CRS patterns, the first CORESET value being different from the second CORESET value.

10. The user equipment of claim 9, wherein the at least two PDSCHs are associated with a first radio access technology (RAT) and the first and second sets of CRS patterns are associated with a second RAT.

11. The user equipment of claim 10, wherein the first RAT is New Radio (NR) and the second RAT is Long Term Evolution (LTE).

12. The user equipment of claim 9, wherein the at least two PDSCHs are received in a same slot.

13. The user equipment of claim 9, wherein the first PDSCH is transmitted by a first network node and the second PDSCH is transmitted by a second network node, the second network node being different from the first network node.

14. The user equipment of claim 9, wherein:
the first PDSCH and the first set of CRS patterns are associated with at least one of a first transmission configuration indicator (TCI) state and a first code division multiplexing (CDM) group; and
the second PDSCH and the second sets of CRS patterns are associated with at least one of a second TCI state and a second CDM group.

15. The user equipment of claim 9, wherein the processing circuitry is further configured to cause the user equipment to:
receive a configuration indicating the first and second sets of CRS patterns; and
receive a downlink control information (DCI) scheduling at least one the first and second PDSCHs, the DCI indicating the at least one of the first and second sets of CRS patterns in the configuration that the scheduled at least one the first and second PDSCHs are to be rate matched around.

16. The user equipment of claim 9, wherein the first and second PDSCHs are scheduled by a same DCI.

17. A network node configured to communicate with a user equipment (UE) the network node comprising processing circuitry, the processing circuitry configured to cause the network node to:
transmit at least one physical downlink shared channel (PDSCH) of at least two PDSCHs;
a first PDSCH of the at least two PDSCHs being associated with a first set of cell-specific reference signal (CRS) patterns and a second PDSCH of the at least two PDSCHs being associated with a second set of CRS patterns; and
wherein the first PDSCH is assumed by the UE to be rate matched around resource elements associated with the first set of CRS patterns and the first PDSCH is scheduled by a first downlink control information (DCI) received in a first control resource set (CORESET) value associated with the first set of CRS patterns; and
wherein the second PDSCH is assumed by the UE to be rate matched around resource elements associated with the second set of CRS patterns and the second PDSCH is scheduled by a second DCI received in a second CORESET value associated with the second set of CRS patterns, the first CORESET value being different from the second CORESET value.

* * * * *